United States Patent
Paul et al.

(10) Patent No.: US 10,458,217 B2
(45) Date of Patent: Oct. 29, 2019

(54) REAL-TIME ENGINEERING ANALYSIS BASED SYSTEM CONTROL

(71) Applicant: Accenture Global Solutions Limited, Dublin (IE)

(72) Inventors: Sanjoy Paul, Sugar Land, TX (US); Farrukh Akram, Calgary (CA); Sudhir Ranganna Patavardhan, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 129 days.

(21) Appl. No.: 15/220,583

(22) Filed: Jul. 27, 2016

(65) Prior Publication Data
US 2017/0351227 A1    Dec. 7, 2017

(30) Foreign Application Priority Data
Jun. 1, 2016  (IN) .............................. 201641018830

(51) Int. Cl.
| | |
|---|---|
| G05B 13/04 | (2006.01) |
| E21B 43/24 | (2006.01) |
| E21B 41/00 | (2006.01) |
| G05B 13/02 | (2006.01) |
| E21B 47/06 | (2012.01) |
| E21B 43/00 | (2006.01) |

(52) U.S. Cl.
CPC .......... *E21B 43/2406* (2013.01); *E21B 43/00* (2013.01); *G05B 13/048* (2013.01)

(58) Field of Classification Search
CPC .............. G05B 13/0265; G05B 13/042; E21B 41/0092; E21B 43/2406; E21B 47/00; E21B 47/06; E21B 47/065
See application file for complete search history.

(56) References Cited

U.S. PATENT DOCUMENTS

| | | | | |
|---|---|---|---|---|
| 6,225,945 | B1 * | 5/2001 | Loomis .................... | G01S 19/24 342/357.46 |
| 6,304,563 | B1 * | 10/2001 | Blessent .............. | H04B 1/7113 370/335 |
| 2005/0171833 | A1 | 8/2005 | Jost et al. | |
| 2010/0125347 | A1 * | 5/2010 | Martin ................. | G05B 13/044 700/31 |
| 2010/0153330 | A1 | 6/2010 | Desikachari | |
| 2012/0263202 | A1 * | 10/2012 | Steinle ............... | H05B 33/0851 372/38.02 |
| 2013/0166216 | A1 * | 6/2013 | Foot ........................ | E21B 43/00 702/12 |

(Continued)

*Primary Examiner* — Kenneth M Lo
*Assistant Examiner* — Mohammad A Rahman
(74) *Attorney, Agent, or Firm* — Mannava & Kang, P.C.

(57) ABSTRACT

According to examples, system control may include accessing a plurality of procedures to control an operation of a system to prevent an occurrence of a fault in the system and/or a reduction of an output of the system. A highest ranked procedure may be learned from the plurality of procedures to control the operation of the system to prevent the occurrence of the fault in the system and/or the reduction of the output of the system. Real-time data associated with the system may be accessed. Further, the operation of the system may be controlled by applying the highest ranked procedure to prevent the occurrence of the fault in the system and/or the reduction of the output of the system.

19 Claims, 19 Drawing Sheets

(56) References Cited

U.S. PATENT DOCUMENTS

| | | | |
|---|---|---|---|
| 2015/0185329 A1* | 7/2015 | Shimada | G01S 19/39 |
| | | | 342/357.51 |
| 2016/0201453 A1* | 7/2016 | Kaiser | E21B 43/2406 |
| | | | 73/152.29 |
| 2016/0328330 A1* | 11/2016 | Ayub | G06F 12/0875 |
| 2017/0023620 A1* | 1/2017 | Bondarenko | G01R 19/2509 |
| 2017/0308802 A1* | 10/2017 | Ramsoy | G06N 7/005 |

* cited by examiner

REAL-TIME ENGINEERING ANALYSIS BASED SYSTEM CONTROL

BACKGROUND

A system may represent any component, sets of components, manmade or natural structures, and the like, that may be controlled in any manner. System control may include the prevention and/or elimination of degradation of any aspect or operation of the system. System control may include initiation of a response to demands that are placed on the system. Further, system control may include response to changes in the system to meet any type of specified requirements on the system.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
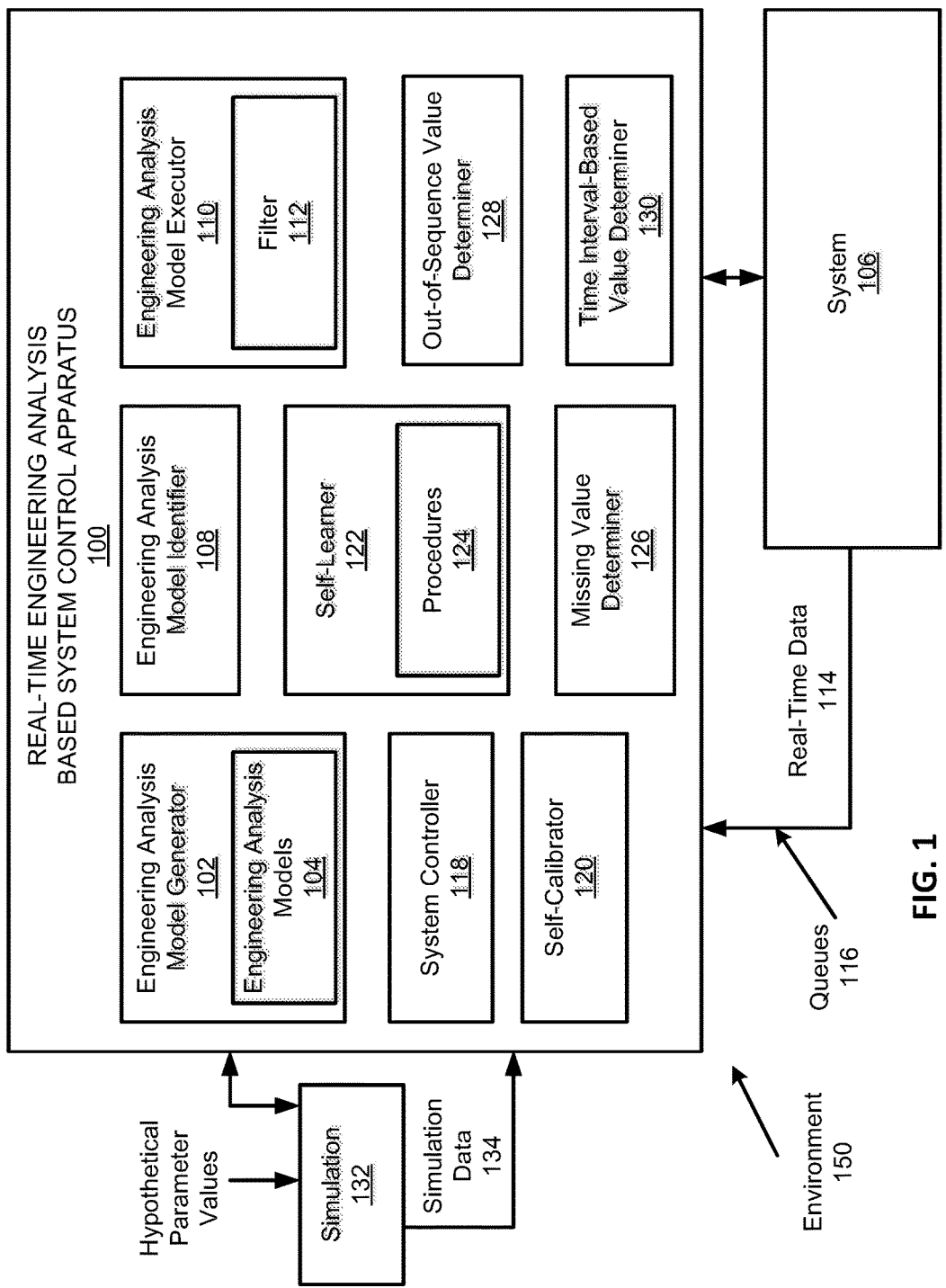
FIG. 1 illustrates an environment including an architecture of a real-time engineering analysis based system control apparatus, according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details.

Throughout the present disclosure, the terms "a" and "an" are intended to denote at least one of a particular element. As used herein, the term "includes" means includes but not limited to, the term "including" means including but not limited to. The term "based on" means based at least in part on.

Control of operations of a system may be applicable in a variety of fields including electrical, mechanical, electro-mechanical, chemical, biotechnology, etc. A system may represent any component, sets of components, manmade or natural structures, and the like, that may be controlled in any manner. Non-limiting examples of a system include a power plant, an underground oil reservoir, a water purifier, an automobile, an aircraft, a manufacturing plant, etc., and components thereof. For a system, control of operations of the system may be based on factors such as a system operator's experience, improvements in industry practices related to the system, historical data analysis, etc. However, such experience, improvements, and historical data analysis are typically used to address faults once they have occurred, or are beginning to occur, based on a comparison of a current scenario to past scenarios that result in faults. A fault may be described as any deviation from a specified or expected operation of a system. Once a fault related to an operation of a system has occurred, the time needed to address the fault may result in economic loss, expensive remedial measures, etc. Further, in certain cases, once a fault related to an operation of a system has occurred, lack of experience and/or other factors may result in production equipment damage. According to examples of the present disclosure, a real-time engineering analysis based system control apparatus solves these challenges by making it possible for the real-time and continuous monitoring and control of operations related to a system, by predicting the potential of the occurrence of faults related to an operation of the system, and by implementing procedures to prevent the occurrence of faults.

The real-time engineering analysis based system control apparatus, and methods for real-time engineering analysis based system control disclosed herein may emulate the function of a system to a relatively high degree of precision. The apparatus disclosed herein may represent a digital version of a system.

An example of an application of the apparatus and methods is disclosed herein with respect to oil production control for steam assisted gravity drainage (SAGD) wells. With respect to SAGD wells, SAGD technology may be applied to an oil reservoir to produce heavy crude oil and bitumen. A pair of generally horizontal wells may be drilled into the oil reservoir. Each well may be disposed a few meters apart. The upper well may be designated as an injector well, and the lower well may be designated as a producer well. High pressure steam may be continuously injected into the upper well to heat the oil adjacent to the injector well, and to reduce the viscosity of the oil. The heated oil is caused to drain into the lower producer well, where the heated oil is pumped out to produce oil.

For an SAGD well, generally vertical wells may be used to drill the corresponding generally horizontal wells. For the injector well, a position at the top of the injector well where a steam injector is located may be designated as an injector well top hole. The injector well top hole may be positioned above ground, and on top of the well. A position at the bottom of the injector well where the well turns from the generally vertical to the generally horizontal position, or at the end of the injector well, may be designated as an injector well bottom hole. In this regard, the injector well bottom hole may be designated by the point where a measurement is being taken, or a point which has been set as a reference for calculations as disclosed herein. Similarly, a position at the top of the producer well where an oil producer is located may be designated as a producer well top hole. A position at the bottom of the producer well where the producer well turns from the generally vertical to the generally horizontal position, or at the end of the producer well, may be designated as a producer well bottom hole. In this regard, the producer well bottom hole may be designated by the point where a measurement is being taken, or a point which has been set as a reference for calculations as disclosed herein.

According to an example, the apparatus and methods disclosed herein may control operations of an SAGD well to maintain and increase oil production by determining, based on the analysis of selected parameter values from parameter values associated with the operation of the SAGD well, the potential of the reduction of the output of the SAGD well. For the SAGD well example, as disclosed herein, examples of parameter values may include producer well top hole flow rate, injector well top hole flow rate, producer well top hole pressure, producer well bottom hole pressure, injector well top hole pressure, injector well bottom hole pressure, temperature, volume, production volumes, etc. An operation of the SAGD well may include steam injection, oil production, solvent/chemical injection, etc., or a combination of different operations. Based on the procedure to prevent the reduction of the output of the SAGD well, the operation of SAGD wells may be controlled to prevent the reduction of the output of the SAGD well. The controlling may further include determining an injector well top hole pressure for the injector well top hole, determining a producer well top hole pressure for the producer well top hole, determining a producer well flow rate for the producer well, determining, based on the producer well top hole pressure and the producer well flow rate, the output of the SAGD well, and determining whether the output of the SAGD well is less than a specified threshold output for the SAGD well. A specified threshold output may be described as an output below which, output is not considered reduced, and the output of the SAGD well should be maintained above this specified threshold output. For example, the specified threshold output may be set as a buffer at 1% of the output value where the output is considered reduced. In response to a determination that the output of the SAGD well is less than the specified threshold output for the SAGD well, the operation of the SAGD well may be controlled, based on the procedure to prevent the reduction of the output of the SAGD well, to prevent the reduction of the output of the SAGD well.

With respect to control of operations of a system, the apparatus and methods disclosed herein may provide for the selection and/or generation of engineering analysis models to model a component of the system, or the system.

An engineering analysis model may be described as a digital version of a component of the system, or the system. For the example of the SAGD well, an engineering analysis model may be described as a digital version of an injector well of the SAGD well. For the example of the SAGD well, other types of engineering analysis models may include engineering analysis models for an oil reservoir, a producer well, etc. An engineering analysis model may also be based on an experience of a field operator. The engineering analysis model may include an input interface to receive real-time input data with respect to the component of the system represented by the engineering analysis model, a component analyzer that models the component of the system represented by the engineering analysis model, and an output interface to generate an output of results of analysis of the real-time input data by the component analyzer.

The component analyzer may include a function or a set of functions that model the steady-state and/or transient behavior of the component of the system. The steady-state behavior may be described as behavior of the component of the system at steady-state operation points (e.g., starting, after a predetermined time duration when a steady-state is reached, under a steady-state operational condition of the component of the system, etc.). For the example of the SAGD well, the steady-state operation points may be described as points where the pressure and/or flow rate related to a component are at a steady state for a predetermined time duration. The transient behavior of the component of the system may be described as the time-varying behavior of the component between different steady-state operation points. For the example of the SAGD well, the transient behavior may be described as behavior where the pressure and/or flow rate related to a component vary during a predetermined time duration.

The apparatus and methods disclosed herein may provide technical solutions to technical problems related, for example, to control of operations of a system. For example, the apparatus and methods disclosed herein may control operations of a system to prevent an occurrence of a fault in the system and/or a reduction of an output of the system. With respect to control of operations of a system, the apparatus and methods disclosed herein may provide for the selection and/or generation of engineering analysis models to model a component of the system, or the system. The engineering analysis models may emulate the associated component and/or functionality of the system to a high degree of precision based on real-time data received from the system.

FIG. 1 illustrates an environment 150 including an architecture of a real-time engineering analysis based system control apparatus 100 (hereinafter "apparatus 100"), according to an example of the present disclosure.

Referring to FIG. 1, an engineering analysis model generator 102 may generate different types of engineering analysis models 104 with respect to control of operations of a system 106. An engineering analysis model may be described as a digital version of any component of the system 106, or the system 106. An engineering analysis model identifier 108 may identify different types of engineering analysis models that are needed for analysis of the system 106 from a plurality of predetermined engineering analysis models 104. An engineering analysis model executor 110 may include a filter 112 that is applied to an associated engineering analysis model. The filter 112 may be used to direct relevant real-time data 114 from queues 116 to the engineering analysis model. The real-time data 114 may include parameter values that are associated, for example, with the engineering analysis models 104, with the system 106, etc. For the example of the SAGD well, examples of parameter values include pressure values, temperature values, flow rate, production, etc. Alternatively, for systems control generally, a parameter may be described as any type of value that is accessed and analyzed to control an operation of the system 106. A system controller 118 may control various operations of the system 106. A self-calibrator 120 may calibrate an engineering analysis model based on an analysis of a calculated output value generated by the engineering analysis model versus a corresponding actual output value. A self-learner 122 may learn appropriate procedures 124 to be applied to the system 106 to control an operation of the system 106. The procedures 124 may be initially determined from application of hypothetical parameter values to a simulation 132, and analysis of simulation data 134. The simulation 132 may be based on the engineering analysis models 104 of the system 106. A missing value determiner 126 may determine a missing data value in the real-time data 114 that is to be used by an engineering analysis model. An out-of-sequence value determiner 128 may determine an out-of-sequence data value in the real-time data 114 that is to be used by an engineering analysis model. A time interval-based value determiner 130 may determine a data value that is available at different time intervals in the real-time data 114.

In some examples, the elements of the apparatus 100 may be machine readable instructions stored on a non-transitory computer readable medium. In this regard, the apparatus 100 may include or be a non-transitory computer readable medium. In some examples, the elements of the apparatus 100 may be hardware or a combination of machine readable instructions and hardware.

Operation of the apparatus 100 is described with reference to FIGS. 1-19. The operations disclosed herein with respect to the various elements of the apparatus 100 may be performed by a processor (e.g., the processor 1702 of FIG. 17). For example, a processor (e.g., the processor 1702 of FIG. 17) may perform the operations disclosed herein with respect to the engineering analysis model generator 102, the engineering analysis model identifier 108, the engineering analysis model executor 110, the system controller 118, the self-calibrator 120, the self-learner 122, the missing value determiner 126, the out-of-sequence value determiner 128, and the time interval-based value determiner 130.

Figure 2:
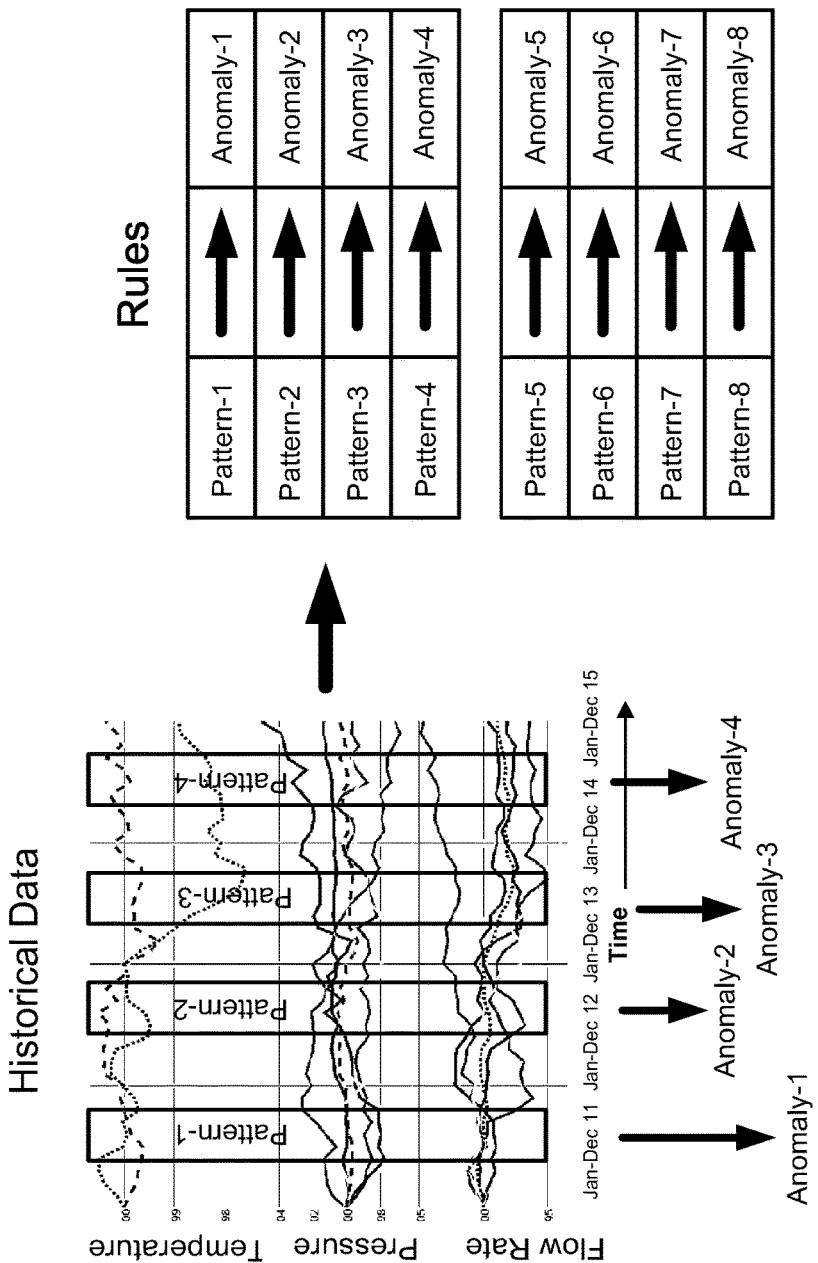
FIG. 2 illustrates anomaly prediction and remedial measure generation for the apparatus of FIG. 1, according to an example of the present disclosure.

FIG. 2 illustrates anomaly prediction and remedial measure generation for the apparatus 100, according to an example of the present disclosure. An anomaly (i.e., fault) may be described as any deviation from a specified or expected operation of the system 106. A remedial measure may be described as any procedure that is used to correct the fault and/or improve an operational performance of the system 106.

Anomalies for the system 106 may be separated into anomalies that have occurred in the past (i.e., past anomalies), and anomalies that have yet to occur (i.e., future anomalies). For example, referring to FIG. 2, for the example of the SAGD well, historical data that may include flow rate, pressure, and temperature related to the system 106 may be used to identify anomalies 1-4 that correspond to patterns 1-4 that have occurred in the past. Alternatively, for systems control generally, historical data may include any type of data that is stored, and then accessed and analyzed to control an operation of the system 106. The apparatus 100 may generate predictions of anomalies 5-8 that correspond to patterns 5-8 that have not yet occurred in the input data. The apparatus 100 may also generate remedial measures related to the anomalies 5-8.

Figure 3:
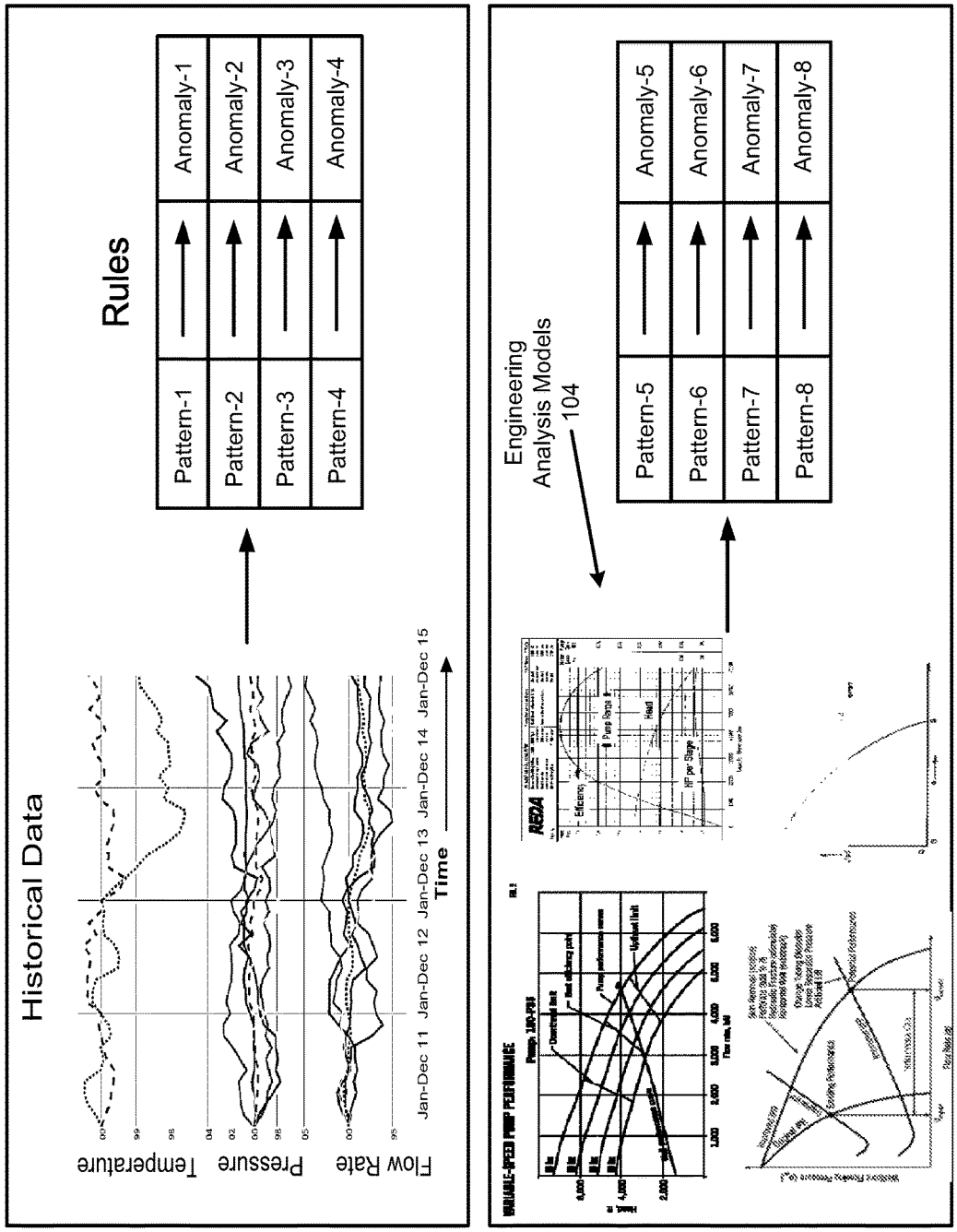
FIG. 3 illustrates application of engineering analysis models for anomaly prediction and remedial measure generation for the apparatus of FIG. 1, according to an example of the present disclosure.

With respect to anomaly prediction and remedial measure generation, FIG. 3 illustrates application of engineering analysis models for anomaly prediction and remedial measure generation for the apparatus 100, according to an example of the present disclosure. Referring to FIGS. 1 and 3, the apparatus 100 may receive real-time data 114 from the system 106, and apply engineering analysis models 104 to generate predictions of anomalies 5-8 that correspond to patterns 5-8 that have not yet occurred in the real-time data 114. The rules/patterns related to anomalies 5-8 may be generated by simulating inputs for the engineering analysis models ahead of time. Once these rules/patterns are identified in the real-time data stream 114, the apparatus 100 predicts a potential anomaly from the anomalies 5-8.

Figure 4:
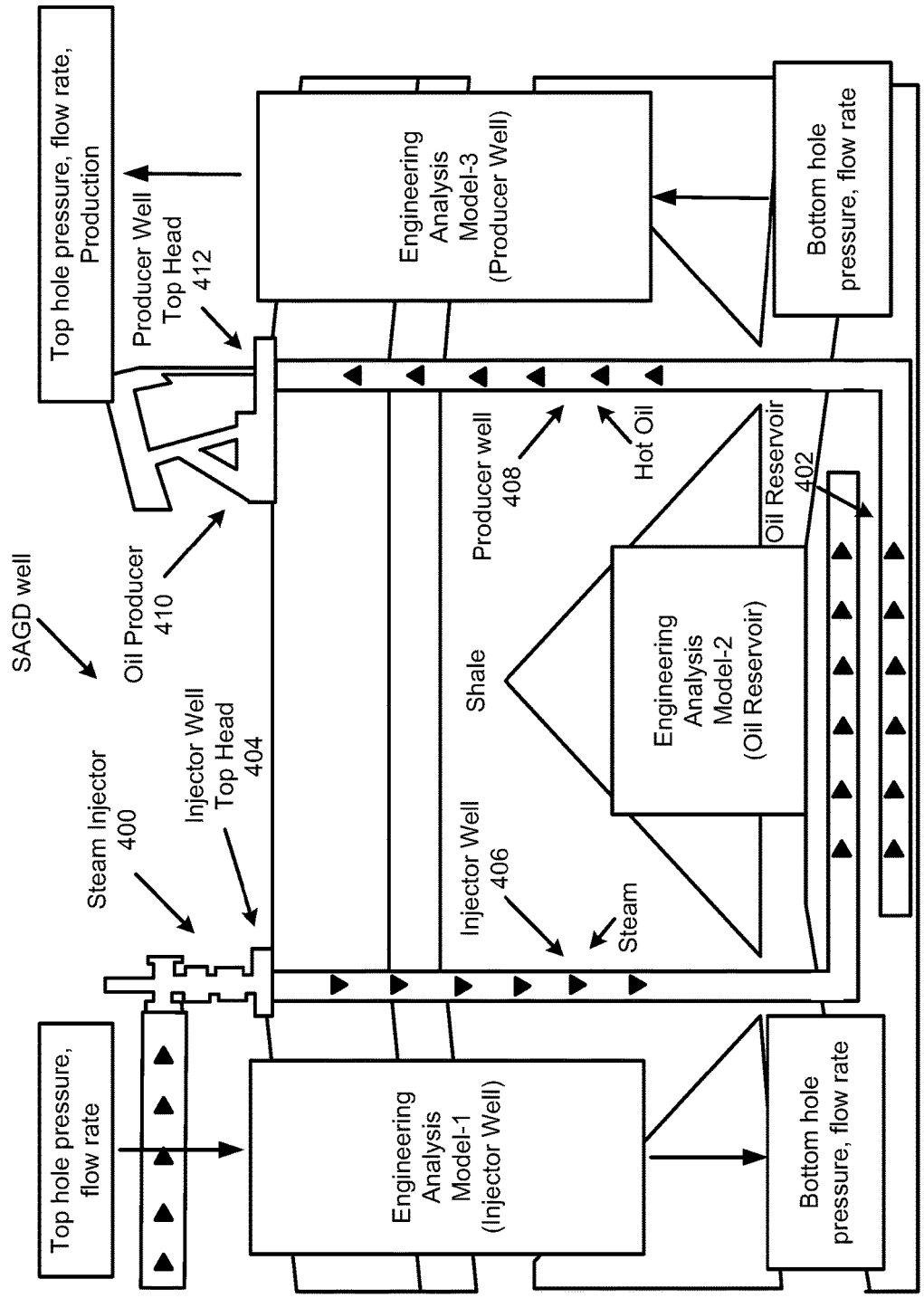
FIG. 4 illustrates oil production control for steam assisted gravity drainage (SAGD) wells, according to an example of the present disclosure.

FIG. 4 illustrates oil production control for SAGD wells, according to an example of the present disclosure.

Referring to FIG. 4, for the example of the application of the apparatus 100 and the methods disclosed herein with respect to oil production control for SAGD wells, an SAGD well may include a steam injector 400 that injects high pressure steam into an oil reservoir 402. The steam may be injected via an injector well top head 404 into an injector well 406. The high pressure steam may heat the oil in the oil reservoir 402 and reduce the viscosity of the oil. The heated oil is caused to drain into the generally horizontal section of the producer well 408. At the producer well 408, the heated oil may be pumped by the oil producer 410, and removed via a producer well top head 412 to produce oil. The injector and producer wells may be disposed adjacent to each other such that the generally horizontal sections extend away from the generally vertical sections along the same direction, or opposite to each other as shown in FIG. 4.

For the injector and producer wells, a heel may be described as the location where the injector and producer wells turn from a generally vertical configuration to a generally horizontal configuration. Further, a toe may be described as the location where the injector and producer wells turn from a generally vertical configuration to a generally horizontal configuration, or alternatively, at the end-most locations of the generally horizontal sections of the injector and producer wells, depending on the reference point being used for calculations.

Referring to FIGS. 1 and 4, in order to emulate the system 106 for control of operations thereof, the engineering analysis model generator 102 may generate different types of engineering analysis models 104 with respect to the system 106. For example, for a SAGD well, the engineering analysis model generator 102 may generate an engineering analysis model (i.e., engineering analysis model-1) for the injector well 406. Further engineering analysis models 104 may be generated for the oil reservoir 402 (i.e., engineering analysis model-2) and the producer well 408 (i.e., engineering analysis model-3) for anomaly prediction and remedial measure determination with respect to the oil reservoir 402 and the producer well 408. In this manner, different types of engineering analysis models 104 may be generated and utilized with respect to the system 106.

The engineering analysis models 104 may also include predetermined engineering analysis models 104 that are utilized with respect to the system 106. For example, the engineering analysis model identifier 108 may identify different types of engineering analysis models that are needed for analysis of the system 106 from a plurality of predetermined engineering analysis models 104.

Figure 6:
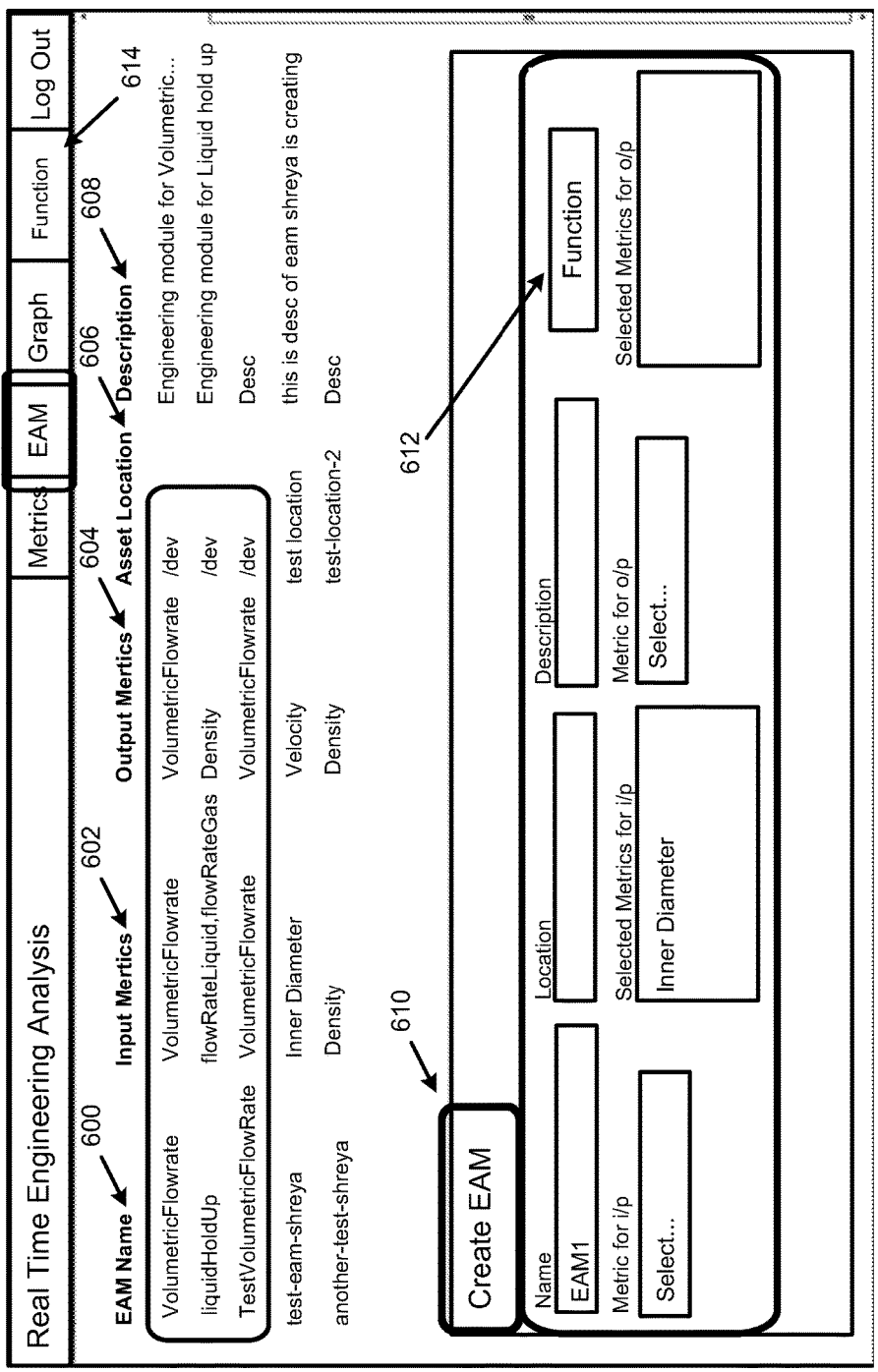
FIG. 6 illustrates generation of an engineering analysis model for the apparatus of FIG. 1, according to an example of the present disclosure.

As disclosed herein with respect to FIG. 6, the engineering analysis models 104 may be customized and/or generated by a user of the apparatus 100.

For the example of the SAGD well, the engineering analysis model-1 for the injector well 406 may receive, as input, data such as top hole pressure and flow rate for the injector well 406, and generate, as output, bottom hole pressure and flow rate for the injector well 406. Similarly, for a SAGD well, the engineering analysis model-2 for the oil reservoir 402 may receive, as input, data such as bottom hole pressure and flow rate for the injector well 406, and generate, as output, bottom hole pressure and flow rate for the producer well 408. Further, for the SAGD well, the engineering analysis model-3 for the producer well 408 may receive, as input, data such as bottom hole pressure and flow rate for the producer well 408, and generate, as output, top hole pressure, flow rate, and oil production volume for the producer well 408. In this manner, an engineering analysis model may receive, as input, various parameter values, and generate, as output, resulting parameter values for the component that is modeled.

Figure 5:
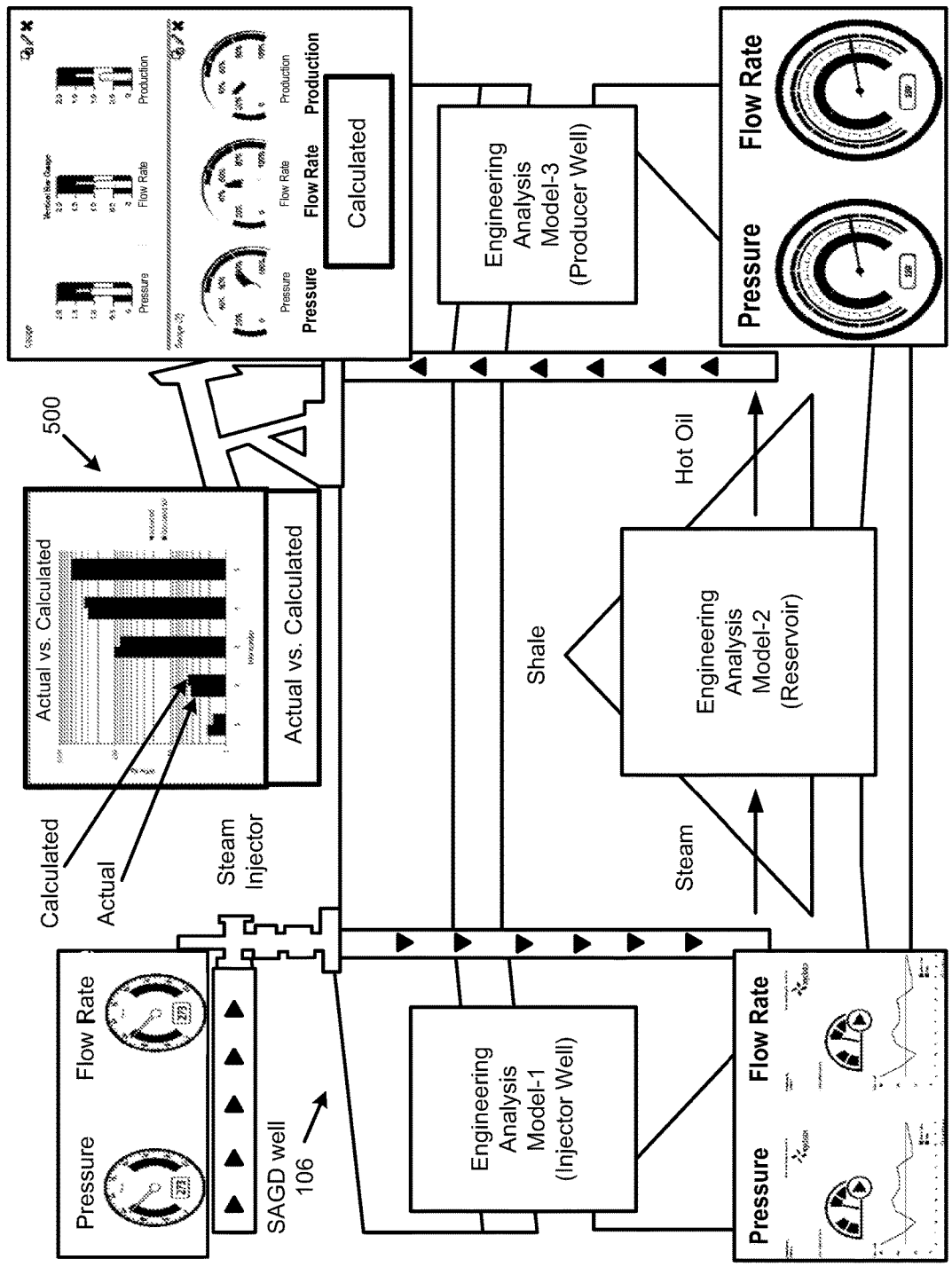
FIG. 5 illustrates further details of oil production control for SAGD wells, according to an example of the present disclosure.

FIG. 5 illustrates further details of oil production control for SAGD wells, according to an example of the present disclosure.

Referring to FIG. 5, with respect to the engineering analysis models 104 illustrated in FIG. 4, various types of analysis may be performed with respect to the system 106. For the example of the SAGD well, as shown at 500, the actual values of the pressure, flow rate, etc., at the bottom hole of the injector well 406 may be plotted against the calculated values at different times, where the calculated values represent values generated by the engineering analysis models 104. Alternatively, for systems control generally, any type of actual values may be plotted against calculated values, where such values are accessed and analyzed to control an operation of the system 106. These actual versus calculated values may be used for self-calibration for the apparatus 100 as disclosed herein with respect to FIG. 9.

FIG. 6 illustrates generation of an engineering analysis model for the apparatus 100, according to an example of the present disclosure.

Referring to FIG. 6, a user of the apparatus 100 may customize and/or generate the engineering analysis models 104. For example, a user of the apparatus 100 may specify a name, input metrics, output metrics, location, and description of different engineering analysis models 104, respectively, at 600, 602, 604, 606, and 608. The name, input metrics, output metrics, location, and description of an engineering analysis model may be specified using a "Create EAM" option at 610, where EAM stands for engineering analysis model. Further, a function, executable code, and/or any type of analytics block associated with an engineering analysis model may be specified at 612. Details with respect to specification of the function, executable code, and/or any type of analytics block associated with an engineering analysis model may be invoked by selection of the "Function" option at 614.

Figure 7:
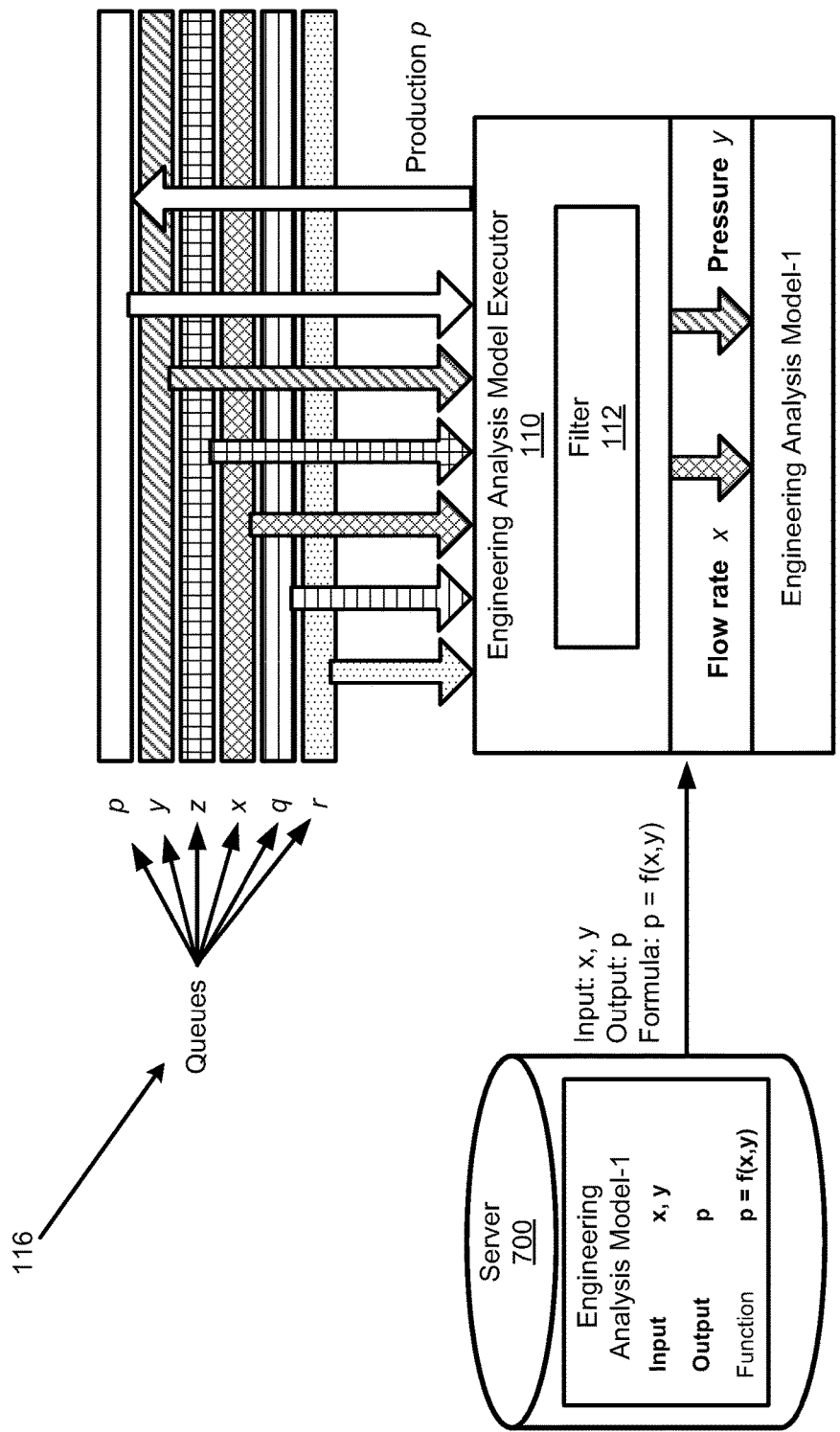
FIG. 7 illustrates execution of an engineering analysis model for the apparatus of FIG. 1, according to an example of the present disclosure.

FIG. 7 illustrates execution of an engineering analysis model for the apparatus 100, according to an example of the present disclosure.

Referring to FIG. 7, each of the engineering analysis models 104 may be stored in a server 700. According to an example, the server 700 may include a Structured Query Language (SQL) server. The engineering analysis model executor 110 may be invoked in real time to retrieve the model parameters from the server 700. Each of the engineering analysis models 104 may receive the real-time data 114 from the set of data queues 116. Alternatively or additionally, the queues 116 may include the simulation data 134, for example, for the simulation 132 of the system 106. For example, the data queues 116 may include queues for data including variables p, y, z, x, q, and r. For the example of the SAGD well, the variables p, y, z, x, q, and r may represent parameters such as producer well top hole flow rate, injector well top hole flow rate, producer well top hole pressure, producer well bottom hole pressure, injector well top hole pressure, injector well bottom hole pressure, temperature, volume, etc., for the system 106. Alternatively, for systems control generally, the variables p, y, z, x, q, and r may represent any type of parameters that are accessed and analyzed to control an operation of the system 106. The parameters may be measured by using appropriate sensors implemented with the system 106, or computed by intermediary engineering analysis models, and transmitted on a real-time basis to the queues 116.

The engineering analysis model executor 110 may access (i.e., receive, or otherwise retrieve) the engineering model parameters including the filter 112 from the server 700, and the filter 112 may be applied to an associated engineering analysis model. For example, the engineering analysis model-1 may include a filter-1 (e.g., see FIG. 8) associated therewith. The filter 112 may be used to select and hence direct relevant data from the queues 116 to the appropriate engineering analysis model. For the example of the SAGD well, the filter 112 may be used to select and direct the data values for flow rate x and pressure y for the engineering analysis model-1 that uses x and y as input, and generates production p as output using the function p=f(x,y) of the engineering analysis model-1. The output value of p may be returned to the queues 116 for further analysis and/or processing.

Figure 8:
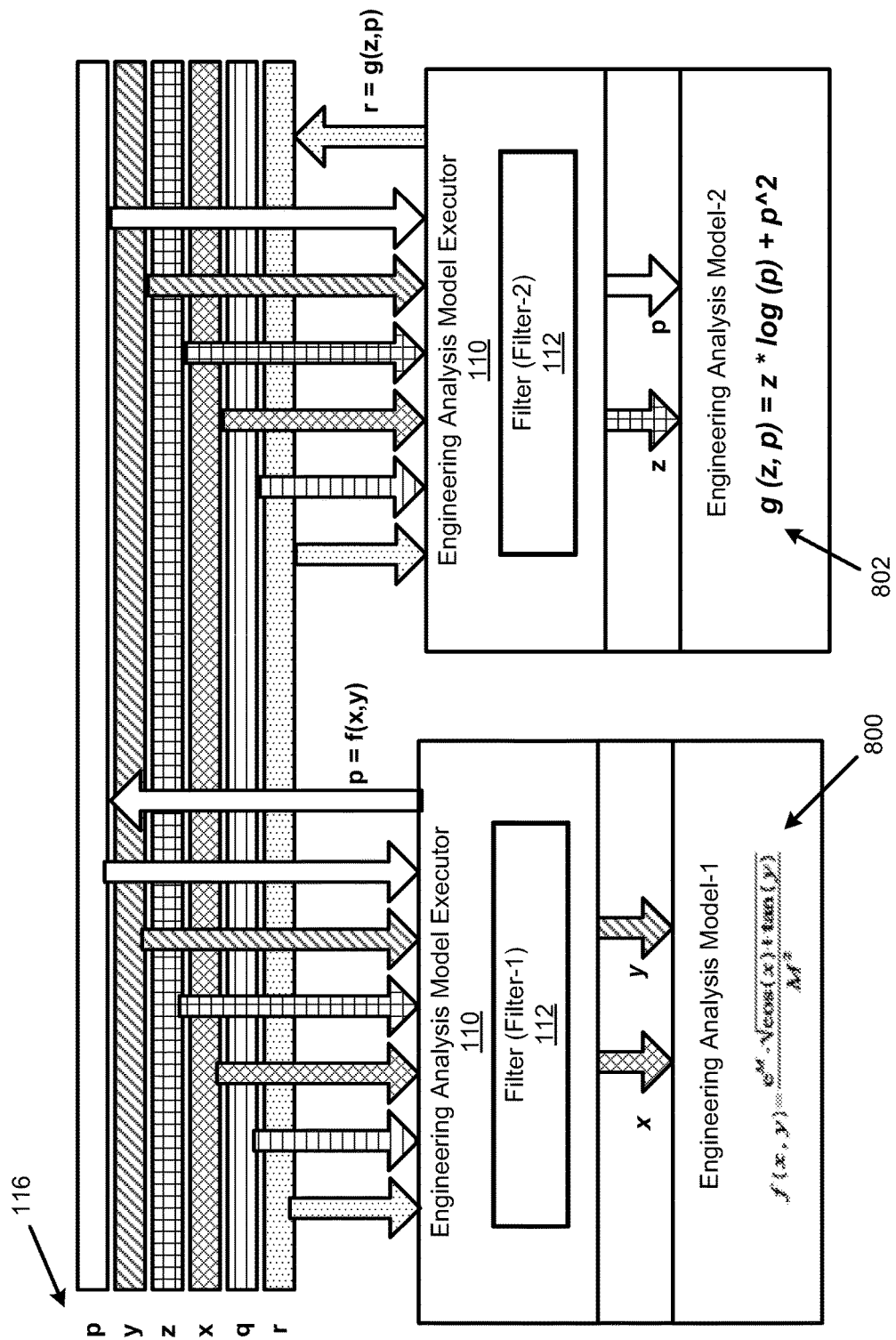
FIG. 8 illustrates composition of engineering analysis models for the apparatus of FIG. 1, according to an example of the present disclosure.

FIG. 8 illustrates composition of engineering analysis models for the apparatus 100, according to an example of the present disclosure.

As disclosed with respect to FIG. 7, the output value of p may be returned to the queues 116 for further analysis and/or processing. Referring to FIG. 8, an example of the function p=f(x,y) of the engineering analysis model-1 is shown at 800. The output value of p may be retrieved by the engineering analysis model executor 110 for execution of an engineering analysis model-2. It should be noted that the engineering analysis model executor 110 is illustrated with respect to the engineering analysis model-1 and the engineering analysis model-2 for illustrative purposes to describe execution of different engineering analysis models 104 with respect to the queues 116. With respect to the engineering analysis model-2, the engineering analysis model executor 110 may include a filter-2 associated therewith. The filter-2 may be used to select and direct the data values z and p for the engineering analysis model-2 that uses z and p as input, and generates r as output using the function g=(z,p) at 802. The output value of r may be returned to the queues 116 for further analysis and/or processing.

In this manner, as illustrated in FIG. 8, a plurality of engineering analysis models 104 may be executed by the engineering analysis model executor 110 using the real-time data 114 from the set of data queues 116.

Figure 9:
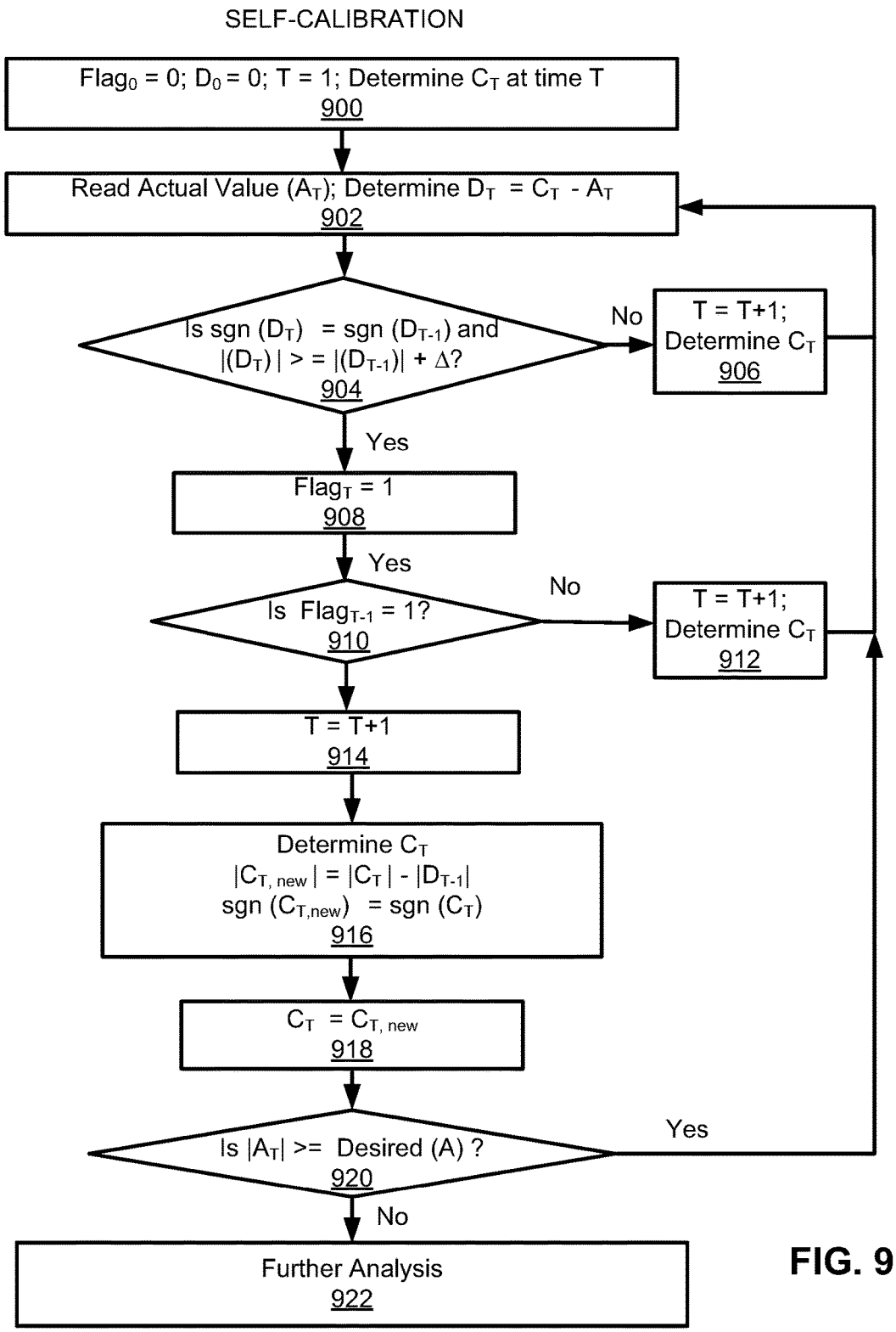
FIG. 9 illustrates a flowchart for self-calibration for the apparatus of FIG. 1, according to an example of the present disclosure.

FIG. 9 illustrates a flowchart for self-calibration for the apparatus 100, according to an example of the present disclosure.

With respect to self-calibration, the engineering analysis models 104 may be executed on a continuous basis. For the example of the SAGD well, the engineering analysis models 104 may be used to evaluate actual versus calculated values, for example, for parameters such as producer well top hole flow rate, injector well top hole flow rate, producer well top hole pressure, producer well bottom hole pressure, injector well top hole pressure, injector well bottom hole pressure, temperature, oil production volume, etc. Alternatively, for systems control generally, the engineering analysis models 104 may be used to evaluate actual versus calculated (i.e., predicted) values for other types of parameters. For such parameters, the engineering analysis models 104 may be self-calibrated by adjusting the output of the engineering analysis models 104.

In order to calibrate the engineering analysis models 104, for each engineering analysis model, referring to FIG. 9, the self-calibrator 120 may implement the steps disclosed herein with reference to blocks 900-922. Based on the self-calibration, the engineering analysis models 104 may represent an exact replica of the associated component and/or functionality of the system 106. In this manner, the engineering analysis models 104 may emulate the associated component and/or functionality of the system 106.

At block 900, in order to determine the calculated value $C_T$ at time T, the self-calibrator 120 may set $Flag_0=0$, $D_0=0$, and T=1, where $Flag_0$ represents a status of the calibration process, and $D_0$ represents a difference between the calculated value $C_T$ and an actual value $A_T$ at time T=0 (i.e., $D_0=C_0-A_0=0$). The time T may represent an increment of time (e.g., 1 minute, 5 minutes, 10 minutes, etc.), as specified for a particular calibration analysis.

At block 902, the self-calibrator 120 may read the actual value $A_T$, and determine the difference $D_T=C_T-A_T$.

At block 904, the self-calibrator 120 may determine whether sgn $(D_T)$=sgn $(D_{T-1})$ and $|(D_T)|>=|(D_{T-1})|+\Delta$?. The "sgn" function may determine a sign value of a number such that if a sign of the number is greater than zero, then the sgn function returns 1, if the sign of the number is equal to zero, then the sgn function returns 0, and if the sign of the number is less than zero, then the sgn function returns −1. In this manner, the self-calibrator 120 may determine whether $D_T$ and $D_{T-1}$ have both increased, decreased, or stayed the same. The self-calibrator 120 may determine whether $D_T$ compared to $D_{T-1}$ is consistent (e.g., consistently high or consistently low)) or inconsistent. Further, the self-calibrator 120 may determine whether a magnitude of $|(D_T)|>=|(D_{T-1})|+\Delta$, where $\Delta$ represents a minimum threshold change value associated with the difference value $D_T$, and $|(D_T)|$ represents the magnitude of $D_T$. If this condition is true, this indicates that the difference between the calculated and actual values has increased in two consecutive intervals by more than the threshold amount $\Delta$. The analysis at block 904 may thus determine whether the calculated value $C_T$ is to be adjusted (if sgn $(D_T)$=sgn $(D_{T-1})$ and $|(D_T)|>=|(D_{T-1})|+\Delta$), or not adjusted (if sgn $(D_T)\neq$sgn $(D_{T-1})$, or $|(D_{T-1})|<|(D_{T-1})|+\Delta$).

In response to a determination at block 904 that sgn $(D_T)\neq$sgn $(D_{T-1})$, or $|(D_T)|<|(D_{T-1})|+\Delta$, at block 906, the self-calibrator 120 may set T=T+1, and determine $C_T$ for T=T+1. Further processing may revert to block 902.

In response to a determination at block 904 that sgn $(D_T)$=sgn $(D_{T-1})$ and $|(D_T)|>=|(D_{T-1})|+\Delta$, at block 908, the self-calibrator 120 may set $Flag_T=1$.

At block 910, the self-calibrator 120 may determine whether $Flag_{T-1}=1$. When both $Flag_T$ and $Flag_{T-1}$ are 1, it indicates that the difference between the calculated and actual values has increased consistently (in back to back intervals), and hence it is likely a trend that needs to be corrected. On the other hand, if $Flag_T$ and $Flag_{T-1}$ are different (0 and 1), it indicates that the difference between the calculated and actual values has not increased consistently (in back to back intervals) and hence it is likely an issue that does not need to be corrected. In this manner, the self-calibrator 120 may determine whether an adjustment to the calculated value $C_T$ was made at a previous iteration so that the calculated value $C_T$ is not adjusted at every iteration of the self-calibration flow.

In response to a determination at block 910 that $Flag_{T-1}\neq 1$, at block 912, the self-calibrator 120 may set T=T+1, and determine $C_T$ for T=T+1. Further processing may revert to block 902.

In response to a determination at block 910 that $Flag_{T-1}=1$, at block 914, the self-calibrator 120 may set T=T+1.

At block 916, the self-calibrator 120 may determine $C_T$ by determining $|C_{T,\ new}|=|C_T|-|D_{T-1}|$, and specifying sgn $(C_{T,new})$=sgn $(C_T)$.

At block 918, the self-calibrator 120 may specify $C_T=C_{T,\ new}$.

At block 920, the self-calibrator 120 may determine whether $|A_T|>=$Desired (A). That is, the self-calibrator 120 may determine whether the magnitude of that actual value that is read at block 902 is greater than or equal to the desired value of A (which is calculated by the engineering analysis model). In this manner, for the example of the SAGD well, the self-calibrator 120 may determine whether there is still life in the oil reservoir 402 such that the actual oil production value is greater than the desired value. Alternatively, the evaluation at block 920 may be set such that the self-calibrator 120 determines whether $|A_T|<=$Desired (A), depending on the requirements of the particular engineering analysis model. For example, for an evaluation at block 920 of $|A_T|<=$Desired (A), A may represent a maximum value of a parameter such as temperature for the system 106. Alternatively, for an evaluation at block 920 of $|A_T|>=$Desired (A), for the example of the SAGD well, A may represent a minimum value of parameters such as producer well top hole flow rate, injector well top hole flow rate, producer well top hole pressure, producer well bottom hole pressure, injector well top hole pressure, injector well bottom hole pressure, etc.

In response to a determination at block 920 that $|A_T|>=$Desired (A) (or $|A_T|<=$Desired (A) as disclosed with respect to block 920), processing may revert to block 902.

In response to a determination at block 920 that $|A_T|<$Desired (A) (or $|A_T|>$Desired (A) as disclosed with respect to block 920), at block 922, the system 106 and/or the equipment related to the system 106 may be subject to further analysis. That is, if the magnitude of the actual value no longer meets the requirements for the parameter associated with the value, then the system 106 and/or the equipment related to the system 106 may no longer meet the minimum or maximum requirements for the parameter associated with the value. This may indicate that the resource (e.g., the oil reservoir in the SAGD well) is exhausted and cannot be further manipulated. For the example of the SAGD well, the parameter associated with the value may include, for example, producer well top hole flow rate, injector well top hole flow rate, producer well top hole pressure, producer well bottom hole pressure, injector well top hole pressure, injector well bottom hole pressure, temperature, production, etc.

Figure 10:
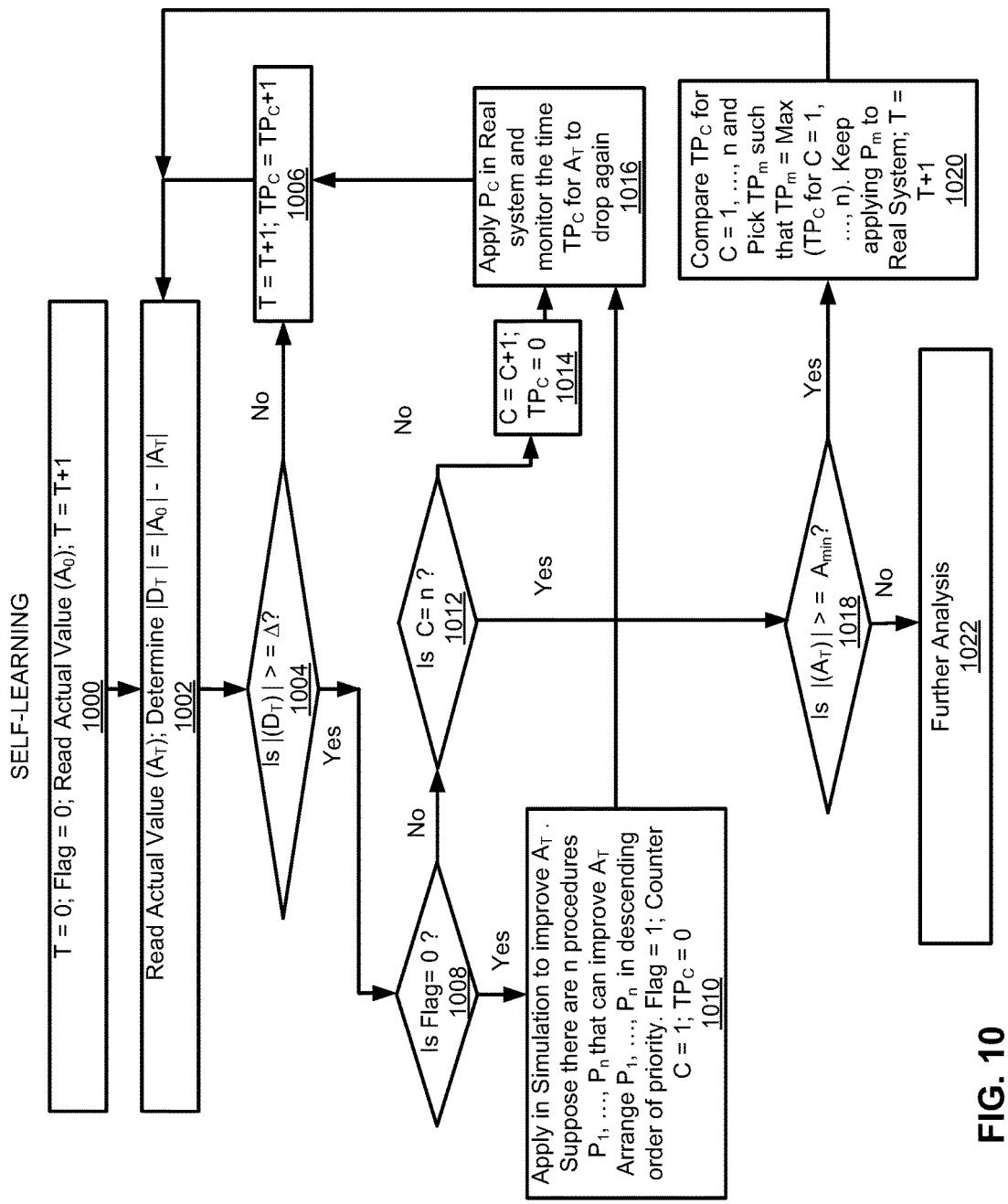
FIG. 10 illustrates a flowchart for self-learning for the apparatus of FIG. 1, according to an example of the present disclosure.

FIG. 10 illustrates a flowchart for self-learning for the apparatus 100, according to an example of the present disclosure.

With respect to self-learning, for the example of the SAGD well, assuming that in order to increase oil production, a procedure $P_1$ includes decreasing flow rate at the injector well, a procedure $P_2$ includes increasing pressure at the injector well and decreasing flow rate at the producer well, etc., up to procedures $P_n$, self-learning may be implemented by the self-learner 122 to apply an appropriate procedure from the procedures $P_1$ to $P_n$ to the system 106. For example, assuming that of the procedures $P_1$ to $P_n$, the procedure $P_2$, which includes increasing pressure at the injector well and decreasing flow rate at the producer well as disclosed herein, is a highest priority procedure for increasing oil production, then the procedure $P_2$ may be implemented before any of the other procedures are implemented for increasing oil production under the given set of circumstances associated with the system 106. In this regard, self-learning may be implemented by the self-learner 122 to determine a priority order of procedures for increasing oil production under different sets of circumstances associated with the system 106. Similarly, self-learning may be implemented by the self-learner 122 to determine a priority order of procedures for controlling operation of the system 106 under different sets of circumstances associated with the system 106. Further, self-learning may account for changes in the operation of the system 106 over time. For example, for the SAGD well example, self-learning may account for oil production volume drop. As disclosed herein, the self-learning may be used to determine a procedure from a plurality of procedures that provides, for example, a highest improvement in the operation of the system 106.

Referring to FIG. 10, at block 1000, with respect to self-learning, the self-learner 122 may set T=0, and Flag=0, read the actual value ($A_0$), and set T=T+1, where Flag represents a status of the self-learning process, and $A_0$ represents the actual value $A_T$ at time T=0. With respect to oil production for the SAGD well example, $A_0$ may represent a maximum (or minimum based on the parameter being evaluated, with the flow of FIG. 10 being modified accordingly) value of oil that is produced by the system 106.

At block 1002, the self-learner 122 may read the actual value ($A_T$), and determine $|D_T|=|A_0|-|A_T|$, where $D_T$ represents a difference between the actual value ($A_0$) and the actual value ($A_T$), and $|D_T|$ represents the magnitude of $D_T$.

At block 1004, the self-learner 122 may determine whether $|(D_T)|>=\Delta$, where $\Delta$ represents the minimum threshold change value associated with the difference value $D_T$. Thus, with respect to oil production for the SAGD well example, the self-learner 122 may determine whether the drop in oil production is greater than or equal to a minimum threshold $\Delta$.

In response to a determination at block 1004 that $|(D_T)|<\Delta$, at block 1006 the self-learner 122 may set T=T+1, and $TP_C=TP_C+1$, where $TP_C$ represents a time value associated with $P_C$, and $P_C$ represents a procedure that is applied to the system 106.

In response to a determination at block 1004 that $|(D_T)|>=\Delta$, at block 1008 the self-learner 122 may determine if Flag=0. Flag=0 indicates that no procedure has been applied thus far.

In response to a determination at block 1008 that Flag=0, at block 1010, different procedures may be applied in the simulation 132 of the system 106 to improve $A_T$. The simulation 132 may be based on the engineering analysis models 104 for the system 106. For example, suppose there are n procedures $P_1, \ldots, P_n$ that can improve $A_T$, the self-learner 122 may arrange the procedures $P_1, \ldots, P_n$ in descending order of priority such that the best procedure to improve $A_T$ is designated the highest priority procedure. The procedures $P_1, \ldots, P_n$ may include pre-determined procedures that have been applied to systems and/or hypothetical procedures that have yet to be applied to systems, including the system 106. Further, the self-learner 122 may set Flag=1, a counter C=1, and $TP_C=0$. $TP_C$ may represent the time for the actual value $A_T$ to drop. The counter C keeps track of the number of procedures that have been already tried. Thus C=n indicates that all n procedures have already been tried out.

According to an example, the self-learning as disclosed herein with respect to FIG. 10 may be implemented in sequence after implementation of self-calibration as disclosed herein with respect to FIG. 9. In this regard, once the apparatus 100 is calibrated so that the output of the engineering analysis models 104 matches the actual output associated with the system 106, the procedures $P_1, \ldots, P_n$ may be used to accurately predict behavior of the system 106.

In response to a determination at block 1008 that Flag≠0, at block 1012 the self-learner 122 may determine if C=n, where n represents the number of procedures at block 1010.

In response to a determination at block 1012 that C≠n, at block 1014 the self-learner 122 may set C=C+1, and $TP_C=0$. C≠n indicates there are procedures that have not yet been applied. $TP_C$ may track the time duration (i.e., interval) for which procedure $P_C$ has been effective in maintaining the value of parameter A at the desired level. That is, the greater is the value of $TP_C$, the more effective is the procedure.

At block 1016 the self-learner 122 may apply procedure $P_C$ to the system 106 and monitor the time $TP_C$ for $A_T$ to drop again (or rise depending on the specifics of the $A_T$, for example, where $A_T$ may represent a pressure that may drop or rise depending on whether the procedure $P_C$ is expected to respectively increase or reduce the pressure). For the SAGD well example, because the oil reservoir 402 as shown in FIG. 4 includes heterogeneous properties, a procedure $P_C$ may yield different results for $A_T$ as time progresses after the initial application of the procedure $P_C$. Further processing from block 1016 may revert to block 1006. The application of the procedures $P_1, \ldots, P_n$ to the system 106 may be used to verify whether the priority order as determined by application of the procedures $P_1, \ldots, P_n$ to the simulation 132 of the system 106 at block 1010 is accurate.

At block 1018 the self-learner 122 may determine if $|(A_T)|>=A_{min}$, where $A_{min}$ represents a minimum value of the actual value.

In response to a determination at block 1018 that $|(A_T)|>=A_{min}$, at block 1020 the self-learner 122 may compare $TP_C$ for C=1, ..., n and select $TP_m$ such that $TP_m$=Max ($TP_C$ for C=1, ..., n). In this regard, the self-learner 122 selects the procedure from the procedures applied to the system 106 that results in the highest improvement of $A_T$ for the longest time. Further, the self-learner 122 may continue to apply procedure $P_m$ to the actual system 106, and set T=T+1.

In response to a determination at block 1018 that $|(A_T)|<A_{min}$ (or $|(A_T)|<A_{min}$ in a similar manner as discussed with respect to blocks 920 and 922), at block 1022, the system 106 and/or the equipment related to the system 106 may be subject to further analysis. That is, if the magnitude of the actual value no longer meets the requirements for the parameter associated with the value, then the system 106 and/or the equipment related to the system 106 may no longer meet the minimum or maximum requirements for the parameter associated with the value. For the SAGD well example, the oil reservoir 402 of the SAGD well may no longer include the needed oil reserves to meet the minimum or maximum requirements for the parameter associated with the value.

Figure 11:
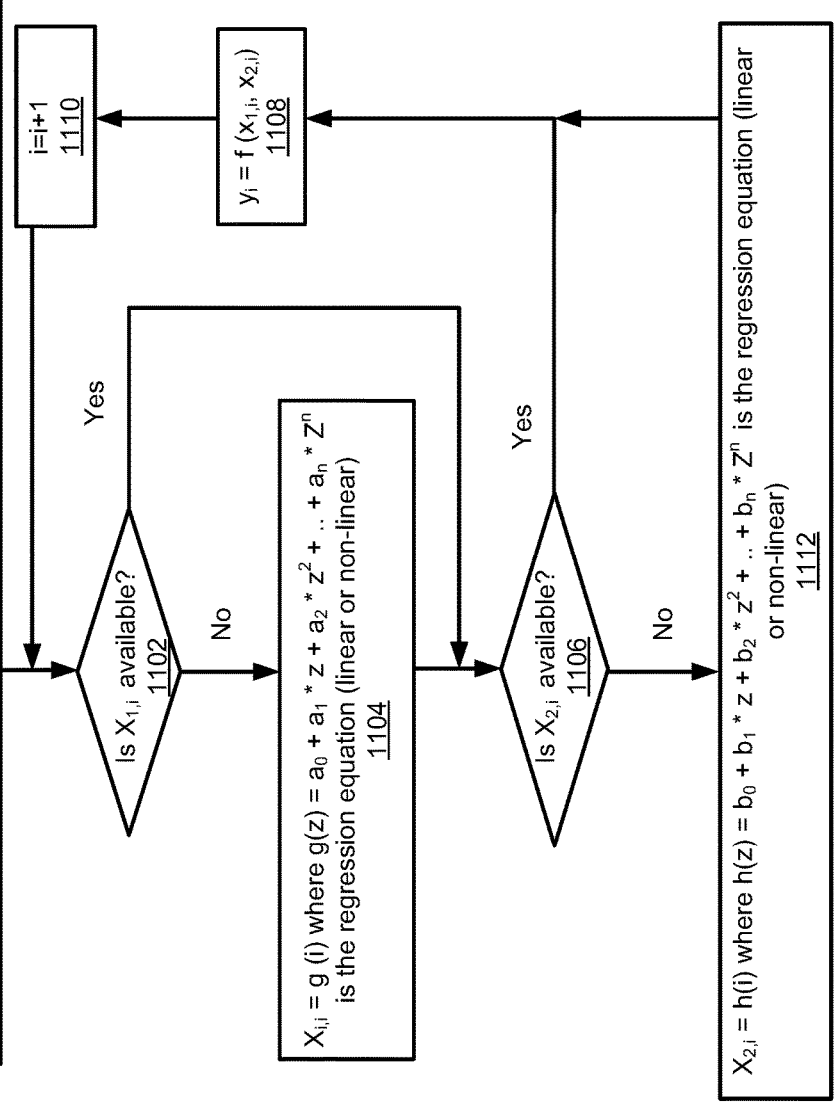
FIG. 11 illustrates a flowchart for determination of a missing value for the apparatus of FIG. 1, according to an example of the present disclosure.

FIG. 11 illustrates a flowchart for determination of a missing value for the apparatus 100, according to an example of the present disclosure.

With respect to missing value determination, referring to FIG. 7, in order to evaluate the function p=f(x,y) (or another function such as y=f ($x_1$, $x_2$, . . . , $x_n$)), the engineering analysis model-1 may retrieve the latest data values x and y. Assuming that the data value x or the data value y is missing, referring to FIG. 11, at block 1100, the missing value determiner 126 may determine a missing value (e.g., x or y) as follows. Assuming an output variable y=f ($x_1$, $x_2$), the missing value determiner 126 may set $y_i$, $X_{1,i}$ and $X_{2,i}$ to represent the values of the variables y, $x_1$ and $x_2$ at time T=i; i=0; $y_0$=0, g(1)=h(1)=0, $x_{1,0}$=0 and $X_{2,0}$=$X_{2,1}$=0; i=i+1, where y represents an output variable for a function to be performed by an engineering analysis model, and $x_1$ and $x_2$ represent data values that are needed to perform the function to determine y.

At block 1102, the missing value determiner 126 may determine if a value $X_{1,i}$ is available.

In response to a determination at block 1102 that the value $X_{1,i}$ is not available, at block 1104, the missing value determiner 126 may set $X_{i,i}$=g (i), where g(z)=$a_0$+$a_1$*z+$a_2$*$z^2$+ . . . +$a_n$*$Z^n$ is the regression equation (linear or non-linear). Thus, the missing value determiner 126 may interpolate the value $X_{1,1}$ based on the regression equation (linear or non-linear).

At block 1106, the missing value determiner 126 may determine if a value $X_{2,i}$ is available. Further, with respect to block 1102, in response to a determination at block 1102 that the value $X_{1,i}$ is available, processing may proceed directly to block 1106.

In response to a determination at block 1106 that the value $X_{2,i}$ is available, at block 1108, the missing value determiner 126 may set $y_i$=f ($x_{1,i}$, $x_{2,i}$).

At block 1110, the missing value determiner 126 may increment i=i+1, with processing being reverted to block 1102, to ensure that all values for y are continuously determined.

In response to a determination at block 1106 that the value $X_{2,i}$ is not available, at block 1112, the missing value determiner 126 may set $X_{2,i}$=h(i), where h(z)=$b_0$+$b_1$*z+$b_2$*$z^2$+ . . . +$b_n$*$Z^n$ is the regression equation (linear or non-linear). Further processing may revert to block 1108. Thus, the missing value determiner 126 may interpolate the value $X_{2,i}$ based on the regression equation (linear or non-linear).

With respect to missing value determination, for p=f ($x_1$, $x_2$, . . . , $x_n$), additional regression equations (linear or non-linear) may be added in a similar manner as disclosed herein with respect to blocks 1104 and 1110, for determination of any missing data values beyond $x_1$ and $x_2$.

Figure 12:
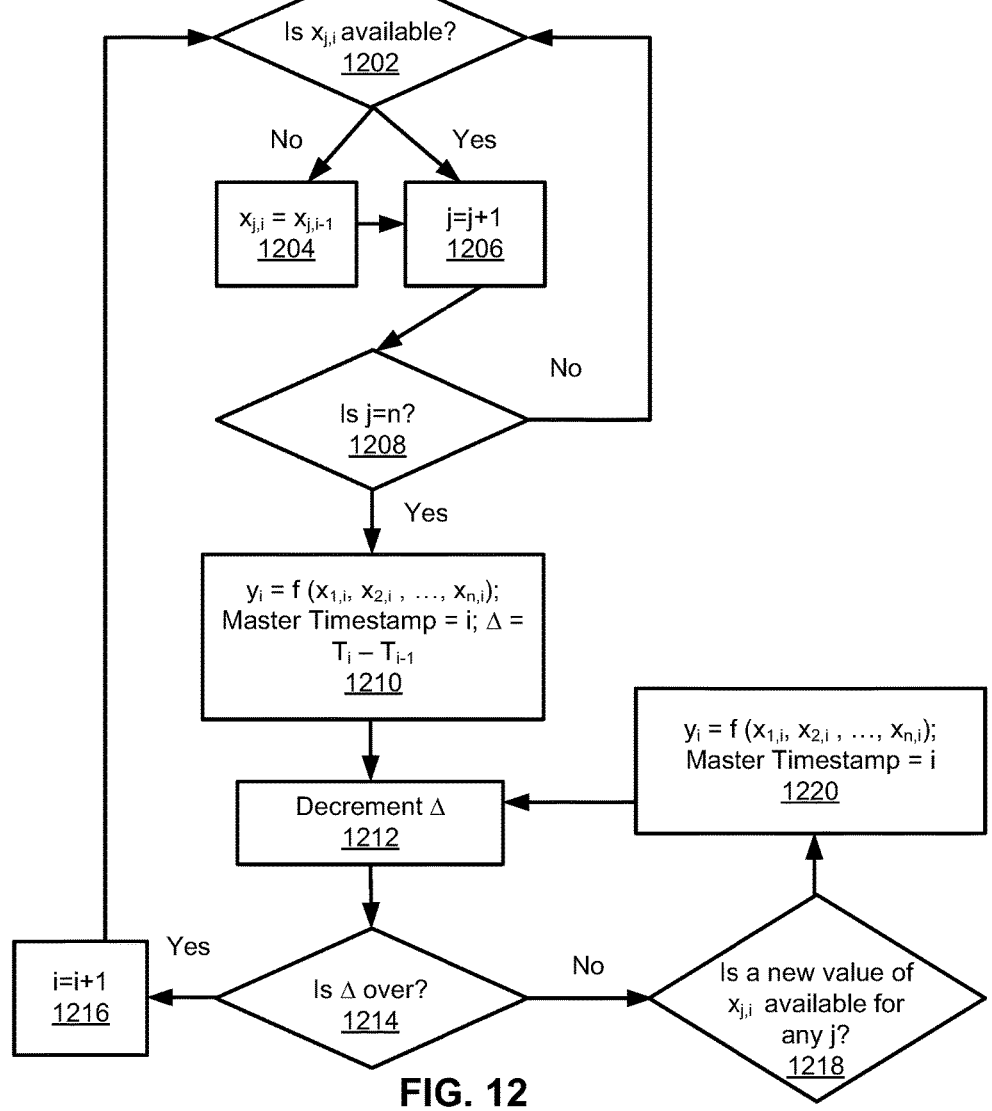
FIG. 12 illustrates a flowchart for determination of an out-of-sequence value for the apparatus of FIG. 1, according to an example of the present disclosure.

FIG. 12 illustrates a flowchart for determination of an out-of-sequence value for the apparatus 100, according to an example of the present disclosure.

With respect to determination of an out-of-sequence value, referring to FIG. 7, in order to evaluate the function p=f(x,y) (or another function such as y=f ($x_1$, $x_2$, . . . , $x_n$)), the determination of an out-of-sequence value may be applied to a case where a data value is received at a later time compared to when the data value is supposed to be available.

Referring to FIG. 12, at block 1200, with respect to out-of-sequence value determination, the out-of-sequence value determiner 128 may determine an out-of-sequence value as follows. Assuming an output variable y=f ($x_1$, $x_2$, . . . , $x_n$), where y represents an output variable for a function to be performed by an engineering analysis model, and $x_1$, $x_2$, . . . , $x_n$ represent data values that are needed to perform the function to determine y, the out-of-sequence value determiner 128 may set $y_i$, $x_{1,i}$, $x_{2,i}$, . . . , $x_{n,i}$ to represent the values of the variables y, $x_1$, $x_2$, . . . , $x_n$ at time T=i. If a timestamp t corresponding to the value of a variable $x_m$ is between T=i and T=i+1, then the out-of-sequence value determiner 128 may determine that the variable $x_m$ is the value of $x_{m,i}$, where $y_0$=0, $x_{j,0}$=0 for all j=1 . . . n; i=1; j=1; Δ=$T_i$−$T_{i-1}$.

At block 1202, the out-of-sequence value determiner 128 may determine if $x_{j,i}$ is available.

In response to a determination at block 1202 that $x_{j,i}$ is not available, at block 1204 the out-of-sequence value determiner 128 may set $x_{j,i}$=$x_{j,i-1}$. Thus, at block 1202, $x_{j,i}$ may be set to the previous value $x_{j,i-1}$.

In response to a determination at block 1202 that $x_{j,i}$ is available, at block 1206 the out-of-sequence value determiner 128 may set j=j+1.

At block 1208, the out-of-sequence value determiner 128 may determine if j=n. That is, the out-of-sequence value determiner 128 may determine if all values for $x_1$, $x_2$, . . . , $x_n$ are analyzed.

In response to a determination at block 1208 that j≠n, further processing may revert to block 1202 until j=n (i.e., all of the $x_{j,i}$ values are analyzed at block 1202).

In response to a determination at block 1208 that j=n, at block 1210 the out-of-sequence value determiner 128 may set $y_i$=f ($x_{1,i}$, $x_{2,i}$, . . . $x_{n,i}$), a master Timestamp=i, and Δ=$T_i$−$T_{i-1}$. At block 1210, Δ may represent the time difference that is used to wait to determine whether a missing value is available. If the out-of-sequence value determiner 128 sets $x_{j,i}$=$x_{j,i-1}$ at block 1204, then at block 1210, $y_i$=f ($x_{1,i}$, $x_{2,i}$, . . . , $x_{n,i}$) is based on $x_{j,i}$ as set at block 1204.

At block 1212, the out-of-sequence value determiner 128 may decrement Δ. For example, Δ may be decremented by increments of ($T_i$−$T_{i-1}$)/4.

At block 1214, the out-of-sequence value determiner 128 may determine if Δ is over.

In response to a determination at block 1214 that Δ is over, at block 1216 the out-of-sequence value determiner 128 may increment i=i+1, with further processing reverting to block 1202.

In response to a determination at block 1214 that Δ is not over, at block 1218 the out-of-sequence value determiner 128 may determine if a new value of $x_{j,i}$ is available for any j. That is, the out-of-sequence value determiner 128 may determine whether the missing value of $x_{j,i}$ from block 1202 is available.

At block 1220, the out-of-sequence value determiner 128 may set $y_i$=f ($x_{1,i}$, $x_{2,i}$, . . . , $x_{n,i}$), and set the master Timestamp=i. That is, if a new value of $x_{j,i}$ is available at block 1218, that value may be used for $y_i$, and otherwise, $y_i$ remains the same as specified at block 1210.

Figure 13:
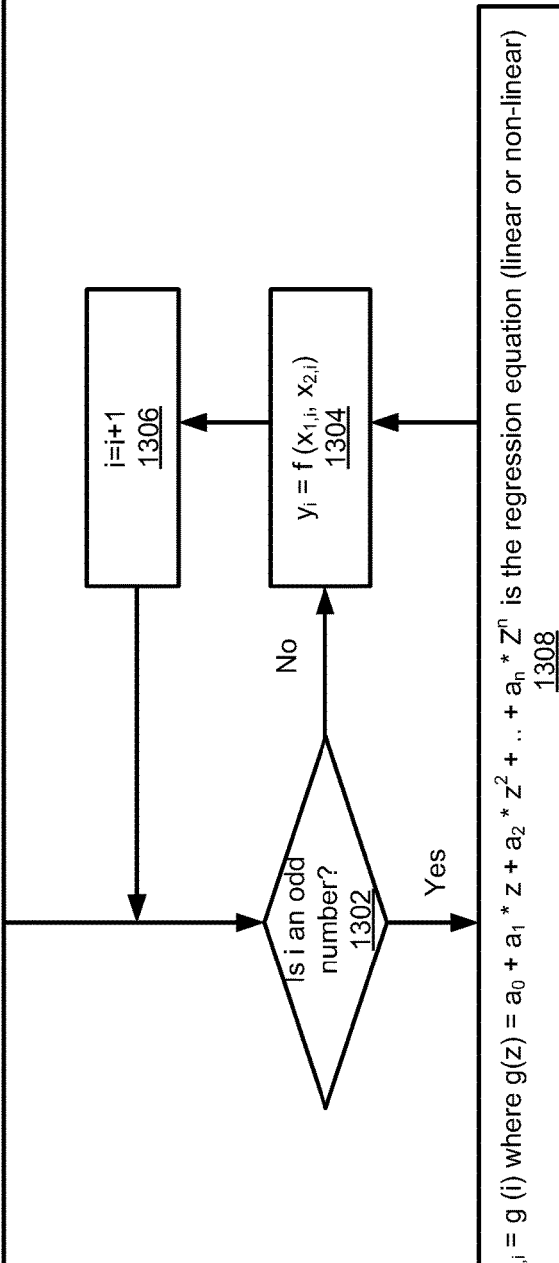
FIG. 13 illustrates a flowchart for determination of values that arrive at different time intervals for the apparatus of FIG. 1, according to an example of the present disclosure.

FIG. 13 illustrates a flowchart for determination of values that arrive at different time intervals for the apparatus 100, according to an example of the present disclosure.

Referring to FIG. 13, at block 1300, with respect to determination of values that arrive at different time intervals, the time interval-based value determiner 130 may determine a value that arrives at a different time interval as follows. Assuming an output variable y=f ($x_1$, $x_2$), the time interval-based value determiner 130 may set $y_i$, $x_{1,i}$, and $X_{2,i}$ to represent the values of the variables y, $x_1$, and $x_2$ at time T=i. The time interval-based value determiner 130 may sample $x_{1,i}$ for every i, and $X_{2,i}$ for every alternate i (i.e., every 2×i). Further, the time interval-based value determiner 130 may set i=0; $y_0$=0, g(1)=0, $x_{1,0}$=0 and $X_{2,0}$=$X_{2,1}$=0; i=i+1.

At block 1302, the time interval-based value determiner 130 may determine if i is an odd number.

In response to a determination at block 1302 that i is not an odd number, at block 1304 the time interval-based value determiner 130 may set $y_i$=($x_{1,i}$, $x_{2,i}$).

At block 1306, the time interval-based value determiner 130 may set i=i+1, and further processing may revert to block 1302.

In response to a determination at block 1302 that i is an odd number, at block 1308 the time interval-based value determiner 130 may set $X_{2,i}$=g (i), where g(z)=$a_0$+$a_1$*z+ $a_2$*$z^2$+ . . . +$a_n$*$Z^n$ is the regression equation (linear or non-linear). That is, because the value of $X_{2,i}$ is only available every alternate i, the regression equation (linear or non-linear) may be used to determine the value of $X_{2,i}$ that is not available.

Figure 14:
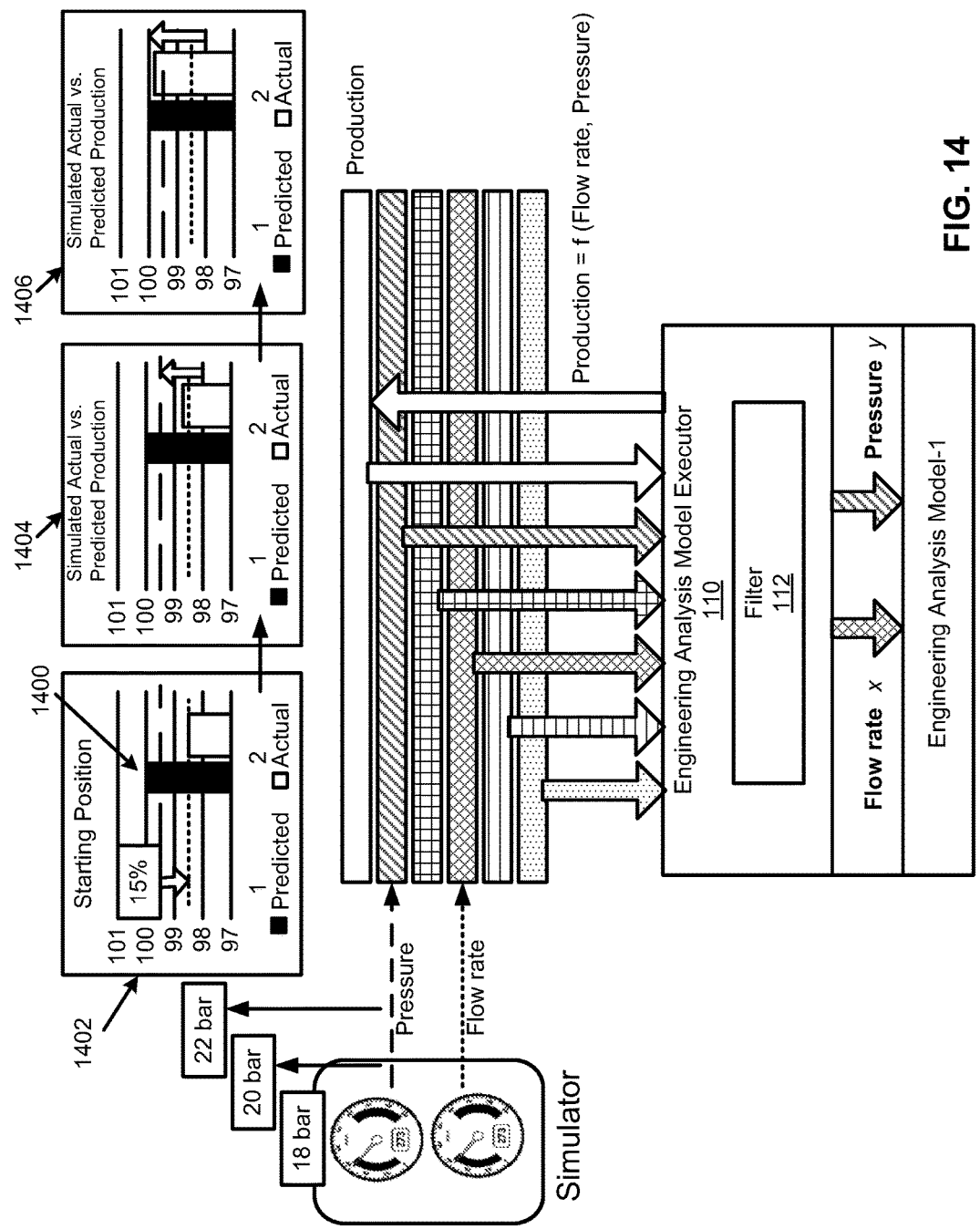
FIG. 14 illustrates operation of the apparatus of FIG. 1 for oil production control for SAGD wells, according to an example of the present disclosure.
Figure 15:
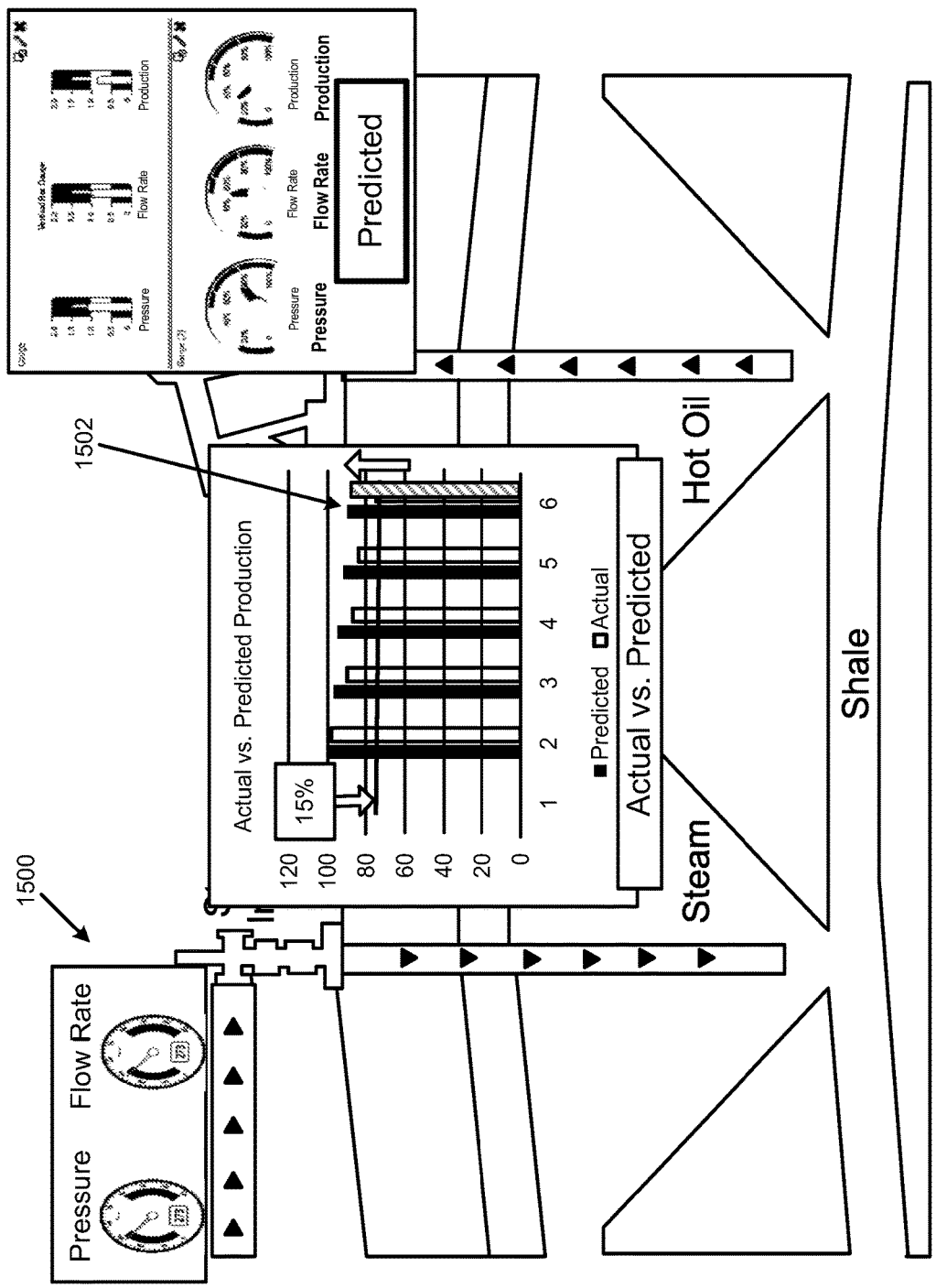
FIG. 15 illustrates operation of the apparatus of FIG. 1 for oil production control for SAGD wells, according to an example of the present disclosure.

FIGS. 14 and 15 illustrate operations of the apparatus 100 for oil production control for SAGD wells, according to an example of the present disclosure.

Referring to FIGS. 1, 4, 9, 10, 14, and 15, with respect to oil production control for the system 106, for example, based on the injector well top hole pressure, an injector well top hole pressure for the injector well top head 404 may be determined. Further, a producer well top hole pressure for the producer well top head 412, and a producer well flow rate for the producer well 408 may be determined. Based on the producer well top hole pressure and the producer well flow rate, the output (i.e., oil production) of the SAGD well may be determined. For example, as shown in FIG. 14, the predicted output of the SAGD well may be determined at 1400. In this regard, as illustrated at blocks 1402, 1404, and 1406, the self-calibration as described herein with respect to FIG. 9 may be applied to ensure that the calculated values with respect to production are indeed accurate. At block 1402, the calculated (i.e., predicted) value may be approximately 15% greater than the actual value. Thus, at blocks 1404 and 1406, the self-calibration as described herein with respect to FIG. 9 may be applied to correct the determination of the calculated values for oil production. Continuing with the example of FIG. 14, the system controller 118 may determine whether the output of the SAGD well is less than a specified threshold output for the SAGD well. Further, in response to a determination that the output of the SAGD well is less than the specified threshold output for the SAGD well, the system controller 118 may control, based on a highest ranked procedure, as determined with respect to self-learning as described with reference to FIG. 10, to prevent the reduction of the output of the SAGD well, the operation of the SAGD well. For example, the highest ranked procedure may include increasing an injector well top hole pressure to prevent the reduction of the output of the SAGD well. In this regard, as shown in FIG. 15, the injector well top hole pressure may be set to a value specified by the modeling of the SAGD well using the engineering analysis models 104. In this regard, the injector well top hole pressure may be set, for example, to 22 bar so that the calculated and actual production values match as shown at 1502.

As disclosed herein, the apparatus 100 receives the real-time data 114 and the simulation data 134. The real-time data 114 may be received from the system 106 and applied in the engineering analysis models 104 to predict an output of the system 106. The output may be predicted on a continuous basis. Over time, as the actual value of the output of the system 106 departs from the predicted value, the system controller 118 generates an indication that some input parameter is to be changed. Based on this indication, the simulation 132 may be used, for example, by an operator of the system 106 to test different hypothetical parameter values. For example, referring to FIG. 14, for the SAGD well example, the hypothetical parameter values include 18 bar, 20 bar, 22 bar, etc. As disclosed herein with respect to block 1010 of FIG. 10, the hypothetical parameter values may be applied to the simulation 132 (which includes the same engineering analysis models 104), with an associated procedure, to determine the impact of the hypothetical values. This process may be conducted off-line. Once a determination is made that the hypothetical parameter values are acceptable, as disclosed herein with respect to block 1016 of FIG. 10, the best hypothetical parameter (and its associated procedure) that results in the desired operation of the system 106 may be applied to the system 106. The simulation 132 may also be performed as part of the apparatus 100, where hypothetical parameter values may be applied to the simulation 132, with ideal parameter values being selected accordingly, and the selected ideal parameter values being applied to the system 106.

Figure 16:
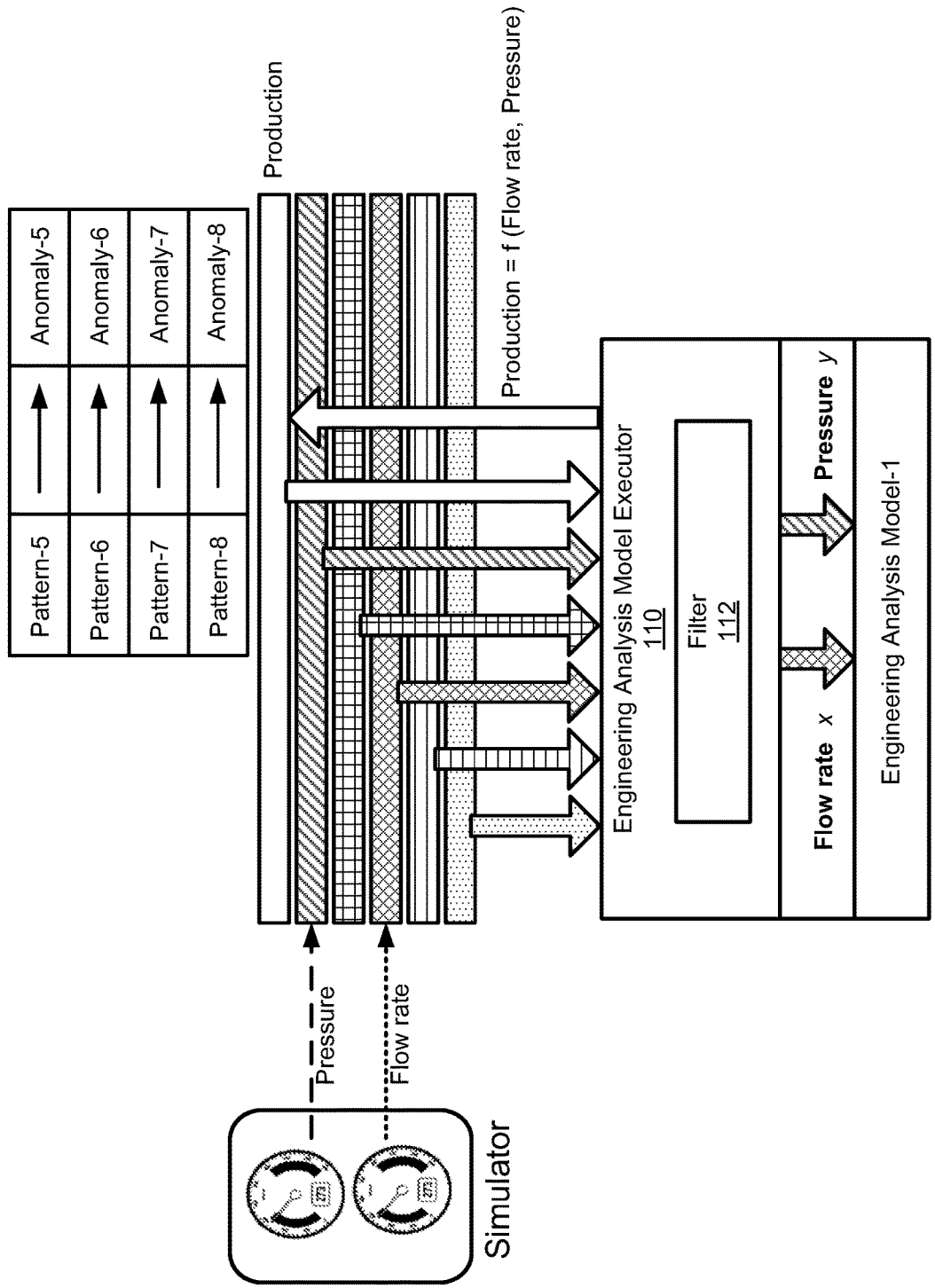
FIG. 16 illustrates further details of operation of the apparatus of FIG. 1 for oil production control for SAGD wells, according to an example of the present disclosure.

FIG. 16 illustrates operation of the apparatus 100 for oil production control for SAGD wells, according to an example of the present disclosure.

Referring to FIGS. 1-3, 10, and 16, the system controller 118 may generate predictions of anomalies 5-8 that correspond to patterns 5-8 that have not yet occurred in the input data. In this regard, a first step may include using the simulation 132 of the system 106 as disclosed herein with respect to block 1010 to also derive rules corresponding to the anomalies 5-8. The derivation of the rules may be performed offline. For the example of the SAGD well, a rule may indicate that a certain pressure or flow-rate will result in decreased production. Thus, generally, a rule may be used to indicate how a parameter or another attribute of the system 106 impacts the performance of the system 106. With respect to a determination of a potential anomaly with respect to the potential of the occurrence of faults related to an operation of the system 106 and/or the reduction of the output of the system 106, the real-time data 114 from the system 106 may be used to check against the rules to predict if any anomaly may occur. The self-learner 122 may generate remedial measures related to the anomalies 5-8. In this regard, the system controller 118 may receive the real-time data 114 from the system 106, and apply engineering analysis models 104 to generate predictions of anomalies 5-8 that correspond to patterns 5-8 that have not yet occurred in the real-time data 114. For example, with respect to the example of FIGS. 14 and 15, assuming that the pattern that results in oil production decrease (e.g., anomaly-5) has not yet occurred in the real-time data 114, but the data pattern in the real-time data 114 matches the rules that predict a potential anomaly, the self-learner 122 may generate and analyze various procedures as disclosed herein with respect to blocks 1010, 1016, and 1020 of FIG. 10, to address the associated anomaly. The highest ranked procedure may include increasing an injector well top hole pressure to prevent the reduction of the output of the SAGD well.

With respect to existing engineering applications and models, such as reservoir simulators, wellbore simulators, nodal analysis techniques, etc., the system 106 may execute such models, techniques, and simulators, etc., to improve an understanding of the changing behavior of components of the system 106 that is being monitored and controlled by the apparatus 100. For the SAGD well example, the components may include wellbores, reservoirs, any type of equipment, and any other piece of the oilfield that is being monitored and controlled by the apparatus 100. The input to these models may be received from the apparatus 100 (using the real-time data 114), and the results of these simulations/techniques may be used by the apparatus 100 to gain knowledge, to predict and understand changing reservoir and well conditions, and to change the testing, calibration, and/or threshold parameters accordingly to ensure that erroneous results are not generated. For the SAGD well example, if a reservoir simulation indicates that the reservoir has been depleted by 60% of its reserves, whereas the oil production rate has been set as 1000 barrels/day, it would be unrealistic to expect the SAGD well to continue to produce 1000 barrels/day. If a reservoir simulation suggests that in order to maintain optimal operating conditions, the producer well should be set at 600 barrels/day such as not to cause undue stress on the reservoir, then the target and relevant thresholds may be changed in the apparatus 100 to the same number. In other words, the apparatus 100 gains knowledge by using existing best practices, already known remedial measures, results from an engineering technique, model, and/or simulation, and from trying different scenarios and remembering procedures that result in desired results and those procedures that do not. This remains a continuous process as the apparatus 100 gains further knowledge. As the apparatus 100 is deployed in different fields, this knowledge capture may be transferred from the new field.

With respect to SAGD wells that utilize steam for oil production, different chemicals and/or solvents may be used as an additive to the steam at different points in time, with the concentration of the chemicals and/or solvents also being changed to obtain the desired results. In this regard, the apparatus 100 may be similarly applied to SAGD wells that utilize steam, and/or different chemicals and/or solvents as additives to the steam for oil production.

Figure 17:
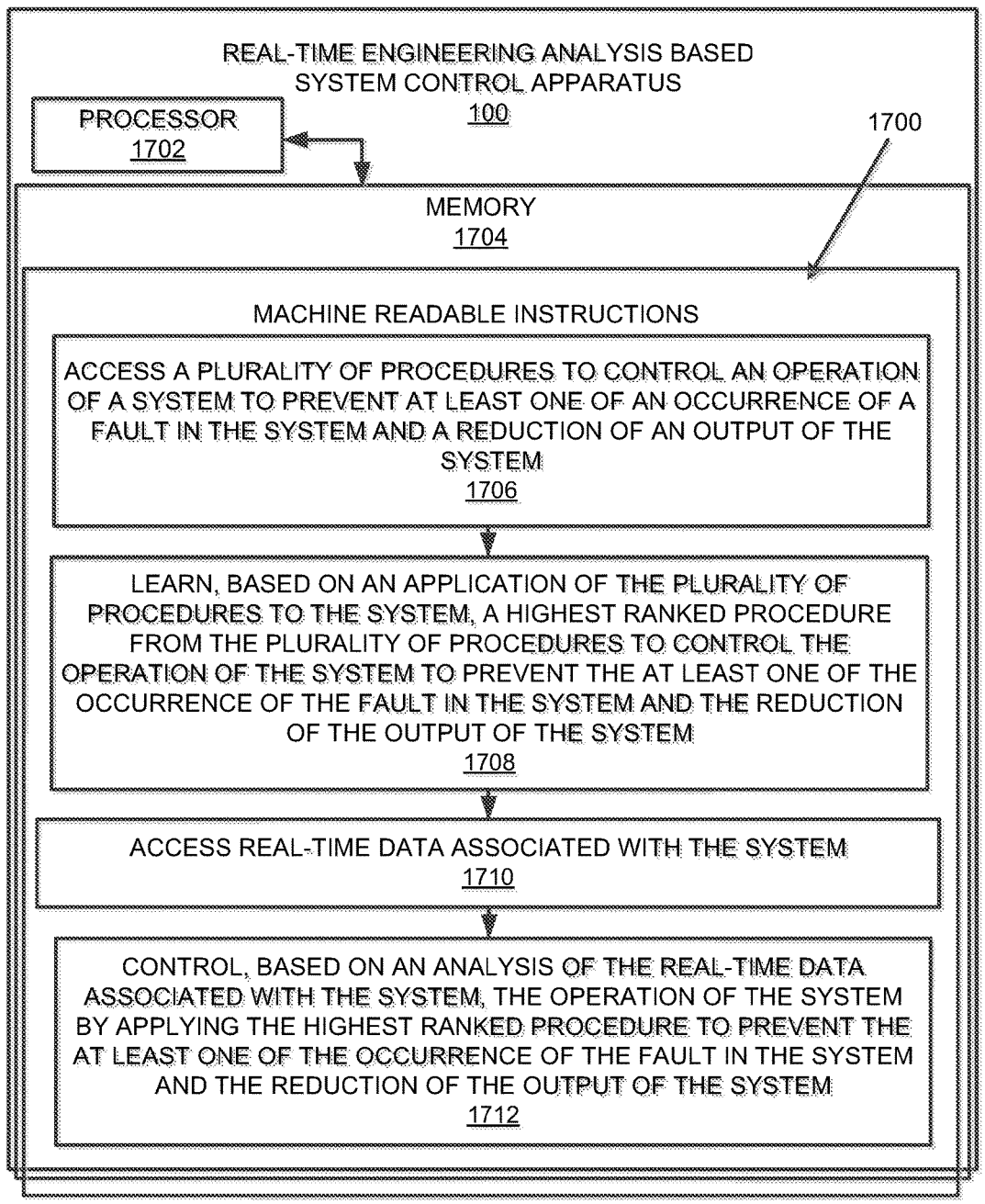
FIG. 17 illustrates a flowchart of a method for real-time engineering analysis based system control, according to an example of the present disclosure.
Figure 18:
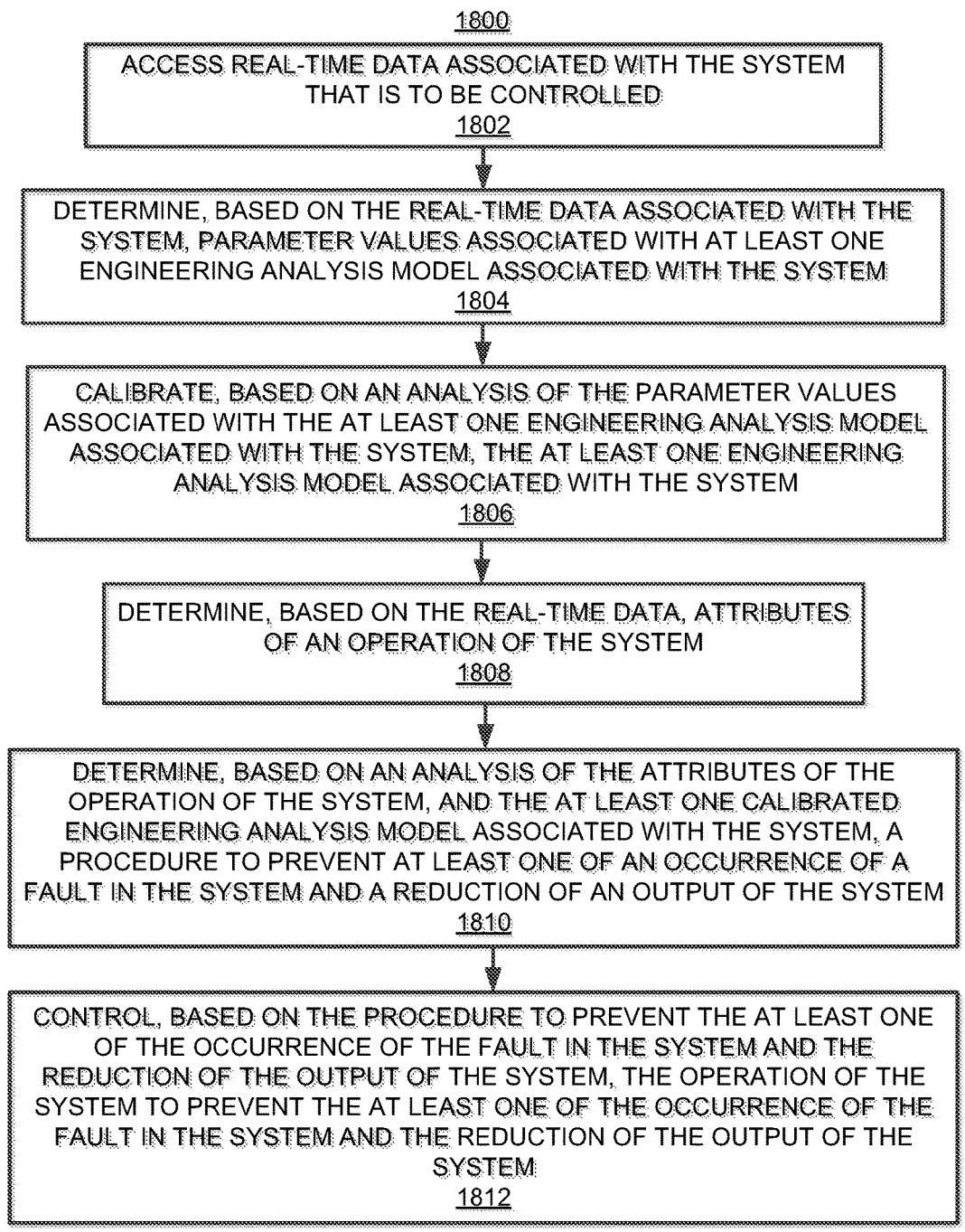
FIG. 18 illustrates a flowchart of another method for real-time engineering analysis based system control, according to an example of the present disclosure.
Figure 19:
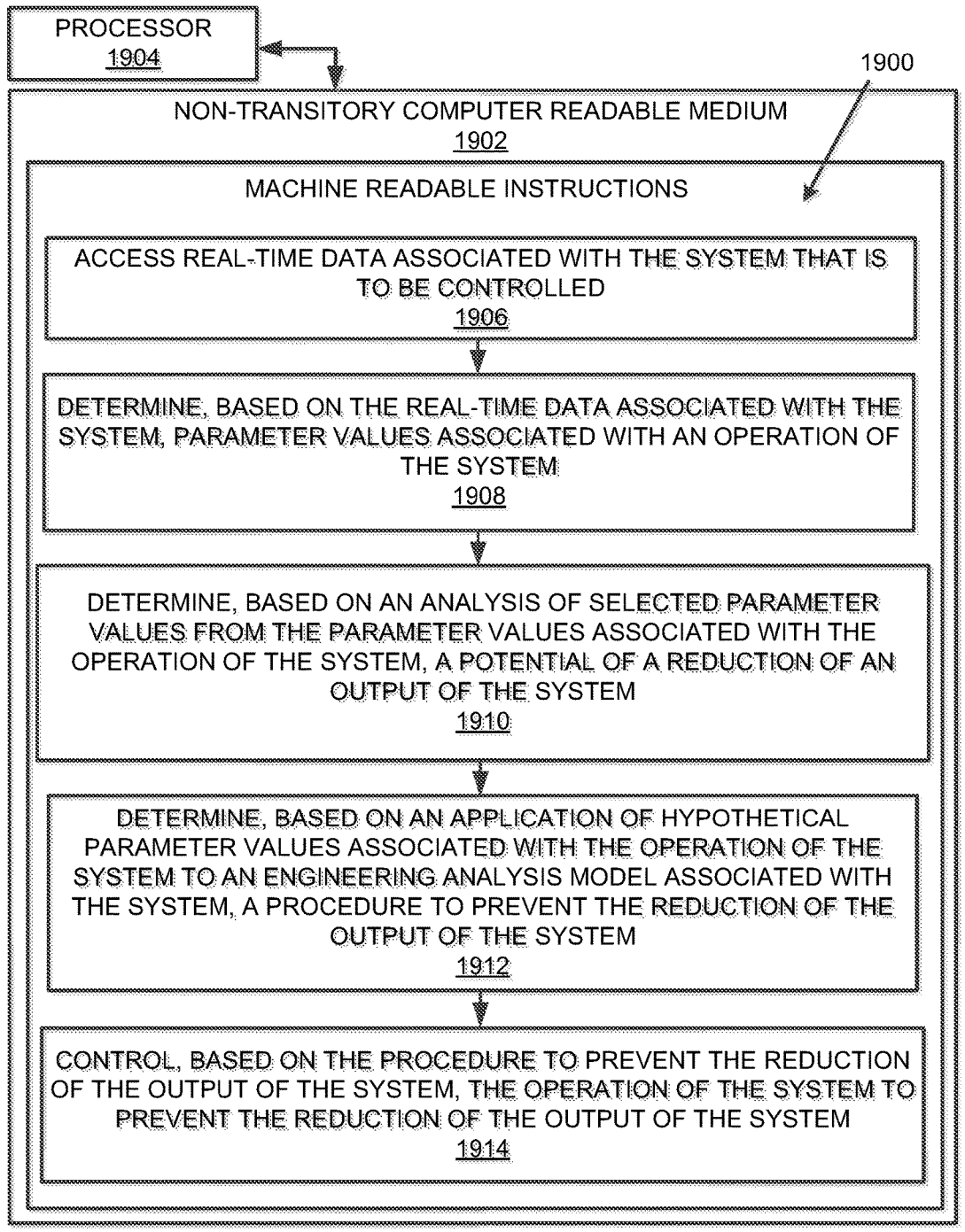
FIG. 19 illustrates a flowchart of a further method for real-time engineering analysis based system control, according to an example of the present disclosure.

FIGS. 17-19 respectively illustrate flowcharts of methods 1700, 1800, and 1900 for real-time engineering analysis based system control, according to examples. The methods 1700, 1800, and 1900 may be implemented on the apparatus 100 described above with reference to FIGS. 1-16 by way of example and not limitation. The methods 1700, 1800, and 1900 may be practiced in other apparatus. In addition to showing the method 1700, FIG. 17 shows hardware of the apparatus 100 that may execute the method 1700. The hardware may include a processor 1702, and a memory 1704 storing machine readable instructions that when executed by the processor cause the processor to perform the steps of the method 1700. The memory 1704 may represent a non-transitory computer readable medium. FIG. 18 may represent a method for real-time engineering analysis based system control, and the steps of the method. FIG. 19 may represent a non-transitory computer readable medium 1902 having stored thereon machine readable instructions to provide real-time engineering analysis based system control. The machine readable instructions, when executed, cause a processor 1904 to perform steps of the method 1900 also shown in FIG. 19.

The processor 1702 of FIG. 17 and/or the processor 1904 of FIG. 19 may include a single or multiple processors or other hardware processing circuit, to execute the methods, functions and other processes described herein. These methods, functions and other processes may be embodied as machine readable instructions stored on a computer readable medium, which may be non-transitory (e.g., the memory 1704 of FIG. 17, and the non-transitory computer readable medium 1902 of FIG. 19), such as hardware storage devices (e.g., RAM (random access memory), ROM (read only memory), EPROM (erasable, programmable ROM), EEPROM (electrically erasable, programmable ROM), hard drives, and flash memory). The memory 1704 may include a RAM, where the machine readable instructions and data for the processor 1702 may reside during runtime.

Referring to FIGS. 1-17, and particularly to the method 1700 shown in FIG. 17, at block 1706, the method 1700 may include accessing (e.g., by the system controller 118, and as disclosed with respect to blocks 1010 and 1016) a plurality of procedures to control an operation of the system 106 to prevent an occurrence of a fault in the system 106 and/or a reduction of an output of the system 106. The plurality of procedures may be determined based on an application of hypothetical parameter values to an engineering analysis model associated with the system 106.

At block 1708, the method 1700 may include learning (e.g., by the self-learner 122, and as disclosed with respect to blocks 1010 and 1016), based on an application of the plurality of procedures to the system 106, a highest ranked procedure from the plurality of procedures to control the operation of the system 106 to prevent the occurrence of the fault in the system 106 and the reduction of the output of the system 106.

At block 1710, the method 1700 may include accessing (e.g., by the system controller 118) real-time data 114 associated with the system 106.

At block 1712, the method 1700 may include controlling (e.g., by the system controller 118), based on an analysis of the real-time data 114 associated with the system 106, the operation of the system 106 by applying the highest ranked procedure to prevent the occurrence of the fault in the system 106 and the reduction of the output of the system 106 106. For example, as disclosed herein with respect to FIGS. 14-16, for the SAGD well example, the system controller 118 may control the operation of the SAGD well to prevent the reduction in oil production.

According to examples, as disclosed herein with respect to blocks 1000, 1002, 1004, and 1006 of FIG. 10, for the method 1700, accessing the plurality of procedures to control the operation of the system 106 to prevent the occurrence of the fault in the system 106 and/or the reduction of the output of the system 106 may further include determining an actual value associated with the operation of the system 106 at a specified time value, determining another actual value associated with the operation of the system 106 at another specified time value, determining a difference between the actual value that corresponds to the specified time value and the other actual value, and determining whether a magnitude of the difference is greater than or equal to a threshold value. In response to a determination that the magnitude of the difference is less than the threshold value, the method 1700 may include determining another difference between the actual value that corresponds to the specified time value and the other actual value at a next time value. Further, the method 1700 may include determining whether the magnitude of the other difference is greater than or equal to the threshold value.

According to examples, as disclosed herein with respect to blocks 1000, 1002, 1004, and 1010 of FIG. 10, for the method 1700, accessing the plurality of procedures to control the operation of the system 106 to prevent the occurrence of the fault in the system 106 and/or the reduction of the output of the system 106 may further include determining an actual value associated with the operation of the system 106 at a specified time value, determining another actual value associated with the operation of the system 106 at another specified time value, determining a difference between the actual value that corresponds to the specified time value and the other actual value, and determining whether a magnitude of the difference is greater than or equal to a threshold value. In response to a determination that the magnitude of the difference is greater than or equal to the threshold value, the method 1700 may include applying the plurality of procedures to control the operation of the system 106 to prevent the occurrence of the fault in the system 106 and/or the reduction of the output of the system 106 to the simulation 132 based on the at least one engineering analysis model to modify the other actual value, and ranking the plurality of procedures in order of priority for modifying the other actual value.

According to examples, as disclosed herein with respect to blocks 1000, 1002, 1004, 1010, and 1016 of FIG. 10, for the method 1700, learning, based on the application of the plurality of procedures to the system 106, the highest ranked procedure from the plurality of procedures to control the operation of the system 106 to prevent the occurrence of the fault in the system 106 and/or the reduction of the output of the system 106 may further include determining an actual value associated with the operation of the system 106 at a specified time value, determining another actual value associated with the operation of the system 106 at another specified time value, determining a difference between the actual value that corresponds to the specified time value and the other actual value, and determining a ranking of the plurality of procedures in order of priority for modifying the other actual value. Further, the method 1700 may include applying selected procedures of the plurality of ranked procedures to the system 106 to control the operation of the system 106 to prevent the occurrence of the fault in the system 106 and/or the reduction of the output of the system 106.

According to examples, as disclosed herein with respect to block 1016 of FIG. 10, for the method 1700, applying the selected procedures of the plurality of ranked procedures to the system 106 to control the operation of the system 106 to prevent the occurrence of the fault in the system 106 and/or the reduction of the output of the system 106 may further include applying the selected procedures of the plurality of ranked procedures to the system 106 to control the operation of the system 106 to prevent the occurrence of the fault in the system 106 and/or the reduction of the output of the system 106 for a time duration until the other actual value decreases.

According to examples, as disclosed herein with respect to block 1020 of FIG. 10, for the method 1700, learning, based on the application of the plurality of procedures to the system 106, the highest ranked procedure from the plurality of procedures to control the operation of the system 106 to prevent the occurrence of the fault in the system 106 and/or the reduction of the output of the system 106, may further include further ranking, based on the application of the selected procedures of the plurality of ranked procedures to the system 106 to control the operation of the system 106 to prevent the occurrence of the fault in the system 106 and/or the reduction of the output of the system 106, the selected procedures of the plurality of ranked procedures, and controlling, based on the highest further ranked procedure, the operation of the system 106 to prevent the occurrence of the fault in the system 106 and/or the reduction of the output of the system 106.

According to examples, as disclosed herein with respect to blocks 1018 and 1020 of FIG. 10, for the method 1700, learning, based on the application of the plurality of procedures to the system, the highest ranked procedure from the plurality of procedures to control the operation of the system 106 to prevent the occurrence of the fault in the system 106 and/or the reduction of the output of the system 106 may further include determining whether the other actual value is greater than a minimum specified actual value. In response to a determination that the other actual value is greater than the minimum specified actual value, the method 1700 may include further selecting, based on the application of the selected procedures of the plurality of ranked procedures to the system 106 to control the operation of the system 106 to prevent the occurrence of the fault in the system 106 and/or the reduction of the output of the system 106, one of the selected procedures of the plurality of ranked procedures to control the operation of the system 106 to prevent the occurrence of the fault in the system 106 and/or the reduction of the output of the system 106, and controlling, based on the further selected procedure, the operation of the system 106 to prevent the occurrence of the fault in the system 106 and/or the reduction of the output of the system 106.

According to examples, as disclosed herein with respect to FIG. 9, the method 1700, may further include calibrating, based on an analysis of parameter values determined from the real-time data and associated with the at least one engineering analysis model associated with the system 106, the at least one engineering analysis model associated with the system 106.

Referring to FIGS. 1-16 and 18, and particularly to the method 1800 shown in FIG. 18, at block 1802, the method 1800 may include accessing (e.g., by the system controller 118), real-time data 114 associated with the system 106 that is to be controlled.

At block 1804, the method 1800 may include determining (e.g., by the system controller 118), based on the real-time data 114 associated with the system 106, parameter values associated with at least one engineering analysis model associated with the system 106. For the SAGD well example, examples of parameter values may include producer well top hole flow rate, injector well top hole flow rate, producer well top hole pressure, producer well bottom hole pressure, injector well top hole pressure, injector well bottom hole pressure, temperature, volume, production volume, etc.

At block 1806, as disclosed herein with respect to FIG. 9, the method 1800 may include calibrating, based on an analysis of the parameter values associated with the at least one engineering analysis model associated with the system 106, the at least one engineering analysis model associated with the system 106.

At block 1808, the method 1800 may include determining (e.g., by the system controller 118), based on the real-time data 114, attributes of an operation of the system 106. For the SAGD well example, examples of attributes may include a determination of whether parameter values such as producer well top hole flow rate, injector well top hole flow rate, producer well top hole pressure, producer well bottom hole pressure, injector well top hole pressure, injector well bottom hole pressure, temperature, volume, production volume, etc., meet, exceed, or are below associated threshold requirements.

At block 1810, the method 1800 may include determining, based on an analysis of the attributes of the operation of the system 106, and the at least one calibrated engineering analysis model associated with the system 106, a procedure to prevent at least one of an occurrence of a fault in the system 106 and a reduction of an output of the system 106. For example, as disclosed herein with respect to FIGS. 9 and 10, for the SAGD well example, the system controller 118 may operate in conjunction with the self-calibrator 120 and the self-learner 122 to determine a procedure to prevent the occurrence of the fault in the system 106 and/or the reduction of the output of the system 106.

At block 1812, the method 1800 may include controlling, based on the procedure to prevent the occurrence of the fault in the system 106 and/or the reduction of the output of the system 106, the operation of the system 106 to prevent the occurrence of the fault in the system 106 and/or the reduction of the output of the system 106.

According to examples, for the method 1800, as disclosed herein with respect to blocks 900 and 902 of FIG. 9, calibrating, based on the analysis of the parameter values associated with the at least one engineering analysis model associated with the system 106, the at least one engineering analysis model associated with the system 106 may further include determining, based on the analysis of the parameter values, a calculated value determined by analyzing the parameter values using the at least one engineering analysis model associated with the system 106. Further, the method 1800 may include determining, based on the real-time data 114, an actual value that corresponds to the calculated value, determining, a difference between the calculated value and the actual value, and calibrating, based on the difference between the calculated value and the actual value, the at least one engineering analysis model associated with the system 106.

According to examples, for the method 1800, as disclosed herein with respect to block 904 of FIG. 9, calibrating, based on the difference between the calculated value and the actual value, the at least one engineering analysis model associated with the system 106, may further include determining, whether a sign of the difference at a specified time value is equal to a sign of the difference at a previous time value, and determining, whether a magnitude of the difference at the specified time value is greater than or equal to a magnitude of the difference at the previous time value, plus a threshold value. In response to a determination that the sign of the difference at the specified time value is equal to the sign of the difference at the previous time value, and the magnitude of the difference at the specified time value is greater than or equal to the magnitude of the difference at the previous time value, plus the threshold value, the method 1800 may include calibrating, based on the difference at the previous time value, the at least one engineering analysis model associated with the system 106.

According to examples, for the method 1800, as disclosed herein with respect to block 916 of FIG. 9, calibrating, based on the difference at the previous time value, the at least one engineering analysis model associated with the system 106, may further include determining, a new calculated value based on a difference between the calculated value determined by analyzing the parameter values using the at least one engineering analysis model associated with the system 106, and the difference at the previous time value, and calibrating, the at least one engineering analysis model associated with the system 106 by assigning a value of the new calculated value to the calculated value determined by analyzing the parameter values using the at least one engineering analysis model associated with the system 106.

According to examples, for the method 1800, as disclosed herein with respect to blocks 904 and 906 of FIG. 9, calibrating, based on the difference between the calculated value and the actual value, the at least one engineering analysis model associated with the system 106, may further include determining, whether a sign of the difference at a specified time value is equal to a sign of the difference at a previous time value, and determining, whether a magnitude of the difference at the specified time value is greater than a magnitude of the difference at the previous time value, plus a threshold value. In response to a determination that the sign of the difference at the specified time value is not equal to the sign of the difference at the previous time value, or the magnitude of the difference at the specified time value is less than the magnitude of the difference at the previous time value, plus the threshold value, the method 1800 may include analyzing, a difference between the calculated value and the actual value for a next time value before calibrating, based on the difference between the calculated value and the actual value, the at least one engineering analysis model associated with the system 106.

Referring to FIGS. 1-16 and 19, and particularly to the method 1900 shown in FIG. 19, at block 1906, the method 1900 may include accessing (e.g., by the system controller 118) real-time data 114 associated with the system 106 that is to be controlled.

At block 1908, the method 1900 may include determining (e.g., by the system controller 118), based on the real-time data 114 associated with the system 106, parameter values associated with an operation of the system 106. For the SAGD well example, examples of parameter values may include producer well top hole flow rate, injector well top hole flow rate, producer well top hole pressure, producer well bottom hole pressure, injector well top hole pressure, injector well bottom hole pressure, temperature, volume, production volume, etc. An operation of the SAGD well may include steam injection, oil production volume, etc., or a combination of different operations.

At block 1910, the method 1900 may include determining (e.g., by the system controller 118), based on an analysis of selected parameter values from the parameter values associated with the operation of the system 106, a potential of a reduction of an output of the system 106. For example, as disclosed herein with respect to FIGS. 14-16, for the SAGD well example, the system controller 118 may analyze various parameter values to determine a potential of reduction in oil production. Moreover, the selected parameter values may include all or some of the parameter values associated with the operation of the system 106.

At block 1912, the method 1900 may include determining, based on an application of hypothetical parameter values associated with the operation of the system 106 to an engineering analysis model associated with the system 106, a procedure to prevent the reduction of the output of the system 106. For example, as disclosed herein with respect to FIGS. 9 and 10, for the SAGD well example, the system controller 118 may operate in conjunction with the self-calibrator 120 and the self-learner 122 to determine a procedure to prevent the reduction of oil production.

At block 1914, the method 1900 may include controlling (e.g., by the system controller 118), based on the procedure to prevent the reduction of the output of the system 106, the operation of the system 106 to prevent the reduction of the output of the system 106. For example, as disclosed herein with respect to FIGS. 14-16, for the SAGD well example, the system controller 118 may control the operation of the SAGD well to prevent the reduction of oil production.

According to examples, for the method 1900, the system 106 may include an SAGD well. For the method 1900, as disclosed herein with respect to FIGS. 14-16, determining, based on the analysis of selected parameter values from the parameter values associated with the operation of the SAGD well, the potential of the reduction of the output of the SAGD well, and controlling, based on the procedure to prevent the reduction of the output of the SAGD well, the operation of the SAGD well to prevent the reduction of the output of the SAGD well, may further include determining an injector well top hole pressure for the injector well top hole, determining a producer well top hole pressure for the producer well top hole, determining a producer well flow rate for the producer well, determining, based on the producer well top hole pressure and the producer well flow rate, the output of the SAGD well, and determining whether the output of the SAGD well is less than a specified threshold output for the SAGD well. A specified threshold output may be described as an output below which output is not considered reduced, and the output of the SAGD well should be maintained above this specified threshold output. For example, the specified threshold output may be set as a buffer at 1% of the output value where the output is considered reduced. In response to a determination that the output of the SAGD well is less than the specified threshold output for the SAGD well, the method 1900 may include controlling, based on the procedure to prevent the reduction of the output of the SAGD well, the operation of the SAGD well to prevent the reduction of the output of the SAGD well.

According to examples, for the method 1900, as disclosed herein with respect to FIGS. 14-16, determining, based on the application of the hypothetical parameter values associated with the operation of the SAGD well to the engineering analysis model associated with the SAGD well, the procedure to prevent the reduction of the output of the SAGD well, may further include determining, based on the application of the hypothetical parameter values associated with the operation of the SAGD well to the engineering analysis model associated with the SAGD well, the procedure that includes increasing an injector well top hole pressure to prevent the reduction of the output of the SAGD well.

According to examples, for the method 1900, as disclosed herein with respect to FIG. 11, determining, based on the real-time data 114 associated with the system 106, the parameter values associated with the operation of the system 106, determining whether a parameter value of the parameter values is available from the real-time data 114 at a specified time value, and in response to a determination that the parameter value is not available at the specified time value, the method 1900 may include applying a regression technique to determining the parameter value.

According to examples, for the method 1900, as disclosed herein with respect to FIG. 12, determining, based on the real-time data 114 associated with the system 106, the parameter values associated with the operation of the system 106, may further include determining whether a parameter value of the parameter values is available from the real-time data 114 at a specified time value. In response to a determination that the parameter value is not available at the specified time value, the method 1900 may include determining, based on an analysis of the real-time data 114 for a specified time duration, whether the parameter value of the parameter values becomes available. In response to a determination within the specified time duration that the parameter value of the parameter values becomes available, the method 1900 may include determining retrieving the parameter value of the parameter values from the real-time data 114. In response to a determination within the specified time duration that the parameter value of the parameter values does not become available, the method 1900 may include determining assigning a previous parameter value from the real-time data 114 to the parameter value of the parameter values.

According to examples, as disclosed herein with respect to FIG. 10, the method 1900 may further include learning, based on the application of the hypothetical parameter values associated with the operation of the system 106 to the engineering analysis model associated with the system 106, a plurality of procedures including the procedure to control the operation of the system 106 to prevent the reduction of the output of the system 106.

According to examples, as disclosed herein with respect to FIG. 9, the method 1900 may further include calibrating, based on an analysis of the parameter values associated with the operation of the system 106, the engineering analysis model associated with the system 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:
1. A system control apparatus comprising:
a processor; and
a memory storing machine readable instructions that when executed by the processor cause the processor to:
   access a plurality of procedures to control an operation of a system to prevent at least one of an occurrence of a fault in the system or a reduction of an output of the system, wherein the plurality of procedures are determined based on an application of hypothetical parameter values to at least one engineering analysis model associated with the system;
   learn, based on an application of the plurality of procedures to the system, a highest ranked procedure from the plurality of procedures to control the operation of the system to prevent the at least one of the occurrence of the fault in the system or the reduction of the output of the system;
   access real-time data associated with the system;
   determine, based on the real-time data associated with the system, parameter values associated with an operation of the system by:
      determining whether a parameter value of the parameter values is available from the real-time data at a specified time value;
      in response to a determination that the parameter value is not available at the specified time value, determining, based on an analysis of the real-time date for a specified time duration, whether the parameter value of the parameter values becomes available;
      in response to a determination within the specified time duration that the parameter value of the parameter values becomes available, retrieving the parameter value of the parameter values from the real-time data; and in response to a determination within the specified time duration that the parameter value of the parameter values does not become available, assigning a previous parameter value from the real-time data to the parameter value of the parameter values; and control, based on an analysis of the real-time data associated with the system and an analysis of the parameter values, the operation of the system by applying the highest ranked procedure to prevent the at least one of the occurrence of the fault in the system or the reduction of the output of the system.

2. The system control apparatus according to claim 1, wherein the machine readable instructions to access the plurality of procedures to control the operation of the system to prevent the at least one of the occurrence of the fault in the system or the reduction of the output of the system further comprise machine readable instructions to cause the processor to:

determine an actual value associated with the operation of the system at the specified time value;

determine another actual value associated with the operation of the system at another specified time value;

determine a difference between the actual value that corresponds to the specified time value and the other actual value;

determine whether a magnitude of the difference is greater than or equal to a threshold value;

in response to a determination that the magnitude of the difference is less than the threshold value, determine another difference between the actual value that corresponds to the specified time value and the other actual value at a next time value; and determine whether the magnitude of the other difference is greater than or equal to the threshold value.

3. The system control apparatus according to claim 1, wherein the machine readable instructions to access the plurality of procedures to control the operation of the system to prevent the at least one of the occurrence of the fault in the system or the reduction of the output of the system further comprise machine readable instructions to cause the processor to:

determine an actual value associated with the operation of the system at the specified time value;

determine another actual value associated with the operation of the system at another specified time value;

determine a difference between the actual value that corresponds to the specified time value and the other actual value;

determine whether a magnitude of the difference is greater than or equal to a threshold value;

in response to a determination that the magnitude of the difference is greater than or equal to the threshold value, apply the plurality of procedures to control the operation of the system to prevent the at least one of the occurrence of the fault in the system or the reduction of the output of the system to a simulation based on the at least one engineering analysis model to modify the other actual value; and rank the plurality of procedures in order of priority for modifying the other actual value.

4. The system control apparatus according to claim 1, wherein the machine readable instructions to learn, based on the application of the plurality of procedures to the system, the highest ranked procedure from the plurality of procedures to control the operation of the system to prevent the at least one of the occurrence of the fault in the system or the reduction of the output of the system further comprise machine readable instructions to cause the processor to:

determine an actual value associated with the operation of the system at the specified time value;

determine another actual value associated with the operation of the system at another specified time value;

determine a difference between the actual value that corresponds to the specified time value and the other actual value;

determine a ranking of the plurality of procedures in order of priority for modifying the other actual value; and apply selected procedures of the plurality of ranked procedures to the system to control the operation of the system to prevent the at least one of the occurrence of the fault in the system or the reduction of the output of the system.

5. The system control apparatus according to claim 4, wherein the machine readable instructions to apply the selected procedures of the plurality of ranked procedures to the system to control the operation of the system to prevent the at least one of the occurrence of the fault in the system or the reduction of the output of the system further comprise machine readable instructions to cause the processor to:

apply the selected procedures of the plurality of ranked procedures to the system to control the operation of the system to prevent the at least one of the occurrence of the fault in the system or the reduction of the output of the system for a time duration until the other actual value decreases.

6. The system control apparatus according to claim 4, wherein the machine readable instructions to learn, based on the application of the plurality of procedures to the system, the highest ranked procedure from the plurality of procedures to control the operation of the system to prevent the at least one of the occurrence of the fault in the system or the reduction of the output of the system further comprise machine readable instructions to cause the processor to:

further rank, based on the application of the selected procedures of the plurality of ranked procedures to the system to control the operation of the system to prevent the at least one of the occurrence of the fault in the system or the reduction of the output of the system, the selected procedures of the plurality of ranked procedures; and control, based on the highest further ranked procedure, the operation of the system to prevent the at least one of the occurrence of the fault in the system or the reduction of the output of the system.

7. The system control apparatus according to claim 4, wherein the machine readable instructions to learn, based on the application of the plurality of procedures to the system, the highest ranked procedure from the plurality of procedures to control the operation of the system to prevent the at least one of the occurrence of the fault in the system or the reduction of the output of the system further comprise machine readable instructions to cause the processor to:

determine whether the other actual value is greater than a minimum specified actual value;

in response to a determination that the other actual value is greater than the minimum specified actual value, further select, based on the application of the selected procedures of the plurality of ranked procedures to the system to control the operation of the system to prevent the at least one of the occurrence of the fault in the system or the reduction of the output of the system, one of the selected procedures of the plurality of ranked procedures to control the operation of the system to prevent the at least one of the occurrence of the fault in the system or the reduction of the output of the system; and control, based on the further selected procedure, the operation of the system to prevent the at least one of the occurrence of the fault in the system or the reduction of the output of the system.

8. The system control apparatus according to claim 1, further comprising machine readable instructions to cause the processor to:

calibrate, based on an analysis of the parameter values determined from the real-time data and associated with the at least one engineering analysis model associated with the system, the at least one engineering analysis model associated with the system.

9. The system control apparatus according to claim 1, wherein the machine readable instructions to control, based on the analysis of the real-time data associated with the system and the analysis of the parameter values, the operation of the system by applying the highest ranked procedure to prevent the at least one of the occurrence of the fault in the system or the reduction of the output of the system further comprise machine readable instructions to cause the processor to:

control, based on the analysis of the real-time data associated with the system to determine that a pattern in the real-time data corresponds to a predicted anomaly and the analysis of the parameter values, the operation of the system by applying the highest ranked procedure to prevent the at least one of the occurrence of the fault in the system or the reduction of the output of the system.

10. A method for controlling a system, the method comprising:

accessing, by at least one processor, real-time data associated with the system that is to be controlled;

determining, by the at least one processor, based on the real-time data associated with the system, parameter values associated with at least one engineering analysis model associated with the system by:

determining whether a parameter value of the parameter values is available from the real-time data at a specified time value;

in response to a determination that the parameter value is not available at the specified time value, determining, based on an analysis of the real-time data for a specified time duration, whether the parameter value of the parameter values becomes available;

in response to a determination within the specified time duration that the parameter value of the parameter values becomes available, retrieving the parameter value of the parameter values from the real-time data; and in response to a determination within the specified time duration that the parameter value of the parameter values does not become available, assigning a previous parameter value from the real-time data to the parameter value of the parameter values;

calibrating, by the at least one processor, based on an analysis of the parameter values associated with the at least one engineering analysis model associated with the system, the at least one engineering analysis model associated with the system by determining, by the at least one processor, based on the analysis of the parameter values, a calculated value determined by analyzing the parameter values using the at least one engineering analysis model associated with the system;

determining, by the at least one processor, based on the real-time data, an actual value that corresponds to the calculated value;

determining, by the at least one processor, a difference between the calculated value and the actual value; and calibrating, by the at least one processor, based on the difference between the calculated value and the actual value, the at least one engineering analysis model associated with the system;

determining, by the at least one processor, based on the real-time data, attributes of an operation of the system;

determining, by the at least one processor, based on an analysis of
the attributes of the operation of the system, and
the at least one calibrated engineering analysis model associated with the system,
a procedure to prevent at least one of an occurrence of a fault in the system or a reduction of an output of the system; and controlling, by the at least one processor, based on the procedure to prevent the at least one of the occurrence of the fault in the system or the reduction of the output of the system, the operation of the system to prevent the at least one of the occurrence of the fault in the system or the reduction of the output of the system.

11. The method according to claim 10, wherein calibrating, by the at least one processor, based on the difference between the calculated value and the actual value, the at least one engineering analysis model associated with the system, further comprises:

determining, by the at least one processor, whether a sign of the difference at the specified time value is equal to a sign of the difference at a previous time value;

determining, by the at least one processor, whether a magnitude of the difference at the specified time value is greater than or equal to a magnitude of the difference at the previous time value, plus a threshold value; and in response to a determination that
the sign of the difference at the specified time value is equal to the sign of the difference at the previous time value, and
the magnitude of the difference at the specified time value is greater than or equal to the magnitude of the difference at the previous time value, plus the threshold value, calibrating, by the at least one processor, based on the difference at the previous time value, the at least one engineering analysis model associated with the system.

12. The method according to claim 11, wherein calibrating, by the at least one processor, based on the difference at the previous time value, the at least one engineering analysis model associated with the system, further comprises:

determining, by the at least one processor, a new calculated value based on a difference between the calculated value determined by analyzing the parameter values using the at least one engineering analysis model associated with the system, and the difference at the previous time value; and calibrating, by the at least one processor, the at least one engineering analysis model associated with the system by assigning a value of the new calculated value to the calculated value determined by analyzing the parameter values using the at least one engineering analysis model associated with the system.

13. The method according to claim 10, wherein calibrating, by the at least one processor, based on the difference between the calculated value and the actual value, the at least one engineering analysis model associated with the system, further comprises:
   determining, by the at least one processor, whether a sign of the difference at the specified time value is equal to a sign of the difference at a previous time value;
   determining, by the at least one processor, whether a magnitude of the difference at the specified time value is greater than a magnitude of the difference at the previous time value, plus a threshold value; and
   in response to a determination that
      the sign of the difference at the specified time value is not equal to the sign of the difference at the previous time value, or
      the magnitude of the difference at the specified time value is less than the magnitude of the difference at the previous time value, plus the threshold value,
      analyzing, by the at least one processor, a difference between the calculated value and the actual value for a next time value before calibrating, based on the difference between the calculated value and the actual value, the at least one engineering analysis model associated with the system.

14. The method according to claim 10, wherein calibrating, by the at least one processor, based on the difference between the calculated value and the actual value, the at least one engineering analysis model associated with the system, further comprises:
   determining, by the at least one processor, whether a difference between the calculated and actual values at successive time intervals has increased consistently; and
   based on a determination that the difference between the calculated and actual values at successive time intervals has increased consistently, controlling, by the at least one processor, based on the procedure to prevent the at least one of the occurrence of the fault in the system or the reduction of the output of the system, the operation of the system to prevent the at least one of the occurrence of the fault in the system or the reduction of the output of the system.

15. A non-transitory computer readable medium having stored thereon machine readable instructions to control a system that includes a steam assisted gravity drainage (SAGD) well, the machine readable instructions, when executed, cause a processor to:
   access real-time data associated with the system that is to be controlled;
   determine, based on the real-time data associated with the system, parameter values associated with an operation of the system by:
      determining whether a parameter value of the parameter values is available from the real-time data at a specified time value;
      in response to a determination that the parameter value is not available at the specified time value, determining, based on an analysis of the real-time data for a specified time duration, whether the parameter value of the parameter values becomes available;
      in response to a determination within the specified time duration that the parameter value of the parameter values becomes available, retrieving the parameter value of the parameter values from the real-time data; and
      in response to a determination within the specified time duration that the parameter value of the parameter values does not become available, assigning a previous parameter value from the real-time data to the parameter value of the parameter values;
   determine, based on an analysis of the parameter values, a calculated value determined by analyzing the parameter values using an engineering analysis model associated with the system;
   determine, based on the real-time data, an actual value that corresponds to the calculated value;
   determine a difference between the calculated value and the actual value; and
   calibrate, based on the difference between the calculated value and the actual value, the engineering analysis model associated with the system
   determine, based on an analysis of selected parameter values from the parameter values associated with the operation of the system, a potential of a reduction of an output of the system;
   determine, based on an application of hypothetical parameter values associated with the operation of the system to the engineering analysis model associated with the system, a procedure to prevent the reduction of the output of the system; and
   control, based on the procedure to prevent the reduction of the output of the system, the operation of the system to prevent the reduction of the output of the system.

16. The non-transitory computer readable medium of claim 15,
   wherein the SAGD well includes an injector well including an injector well top hole and an injector well bottom hole, and a producer well including a producer well top hole and a producer well bottom hole, and
   wherein the machine readable instructions to
      determine, based on the analysis of selected parameter values from the parameter values associated with the operation of the SAGD well, the potential of the reduction of the output of the SAGD well, and
      control, based on the procedure to prevent the reduction of the output of the SAGD well, the operation of the SAGD well to prevent the reduction of the output of the SAGD well, when executed, further cause the processor to:
      determine an injector well top hole pressure for the injector well top hole;
      determine a producer well top hole pressure for the producer well top hole;
      determine a producer well flow rate for the producer well;
      determine, based on the producer well top hole pressure and the producer well flow rate, the output of the SAGD well;
      determine whether the output of the SAGD well is less than a specified threshold output for the SAGD well; and
      in response to a determination that the output of the SAGD well is less than the specified threshold output for the SAGD well, control, based on the procedure to prevent the reduction of the output of the SAGD well, the operation of the SAGD well to prevent the reduction of the output of the SAGD well.

17. The non-transitory computer readable medium of claim 16, wherein the machine readable instructions to determine, based on the application of the hypothetical parameter values associated with the operation of the SAGD well to the engineering analysis model associated with the SAGD well, the procedure to prevent the reduction of the output of the SAGD well, when executed, further cause the processor to:
  determine, based on the application of the hypothetical parameter values associated with the operation of the SAGD well to the engineering analysis model associated with the SAGD well, the procedure that includes increasing an injector well top hole pressure to prevent the reduction of the output of the SAGD well.

18. The non-transitory computer readable medium of claim 15, wherein the machine readable instructions to determine, based on the real-time data associated with the system, the parameter values associated with the operation of the system, when executed, further cause the processor to:
  determine whether a parameter value of the parameter values is available from the real-time data at the specified time value;
  in response to a determination that the parameter value is not available at the specified time value, apply a regression technique to determine the parameter value.

19. The non-transitory computer readable medium of claim 15, further comprising machine readable instructions, when executed, further cause the processor to:
  learn, based on the application of the hypothetical parameter values associated with the operation of the system to the engineering analysis model associated with the system, a plurality of procedures including the procedure to control the operation of the system to prevent the reduction of the output of the system.

\* \* \* \* \*

UNITED STATES PATENT AND TRADEMARK OFFICE
CERTIFICATE OF CORRECTION

PATENT NO.         : 10,458,217 B2
APPLICATION NO.    : 15/220583
DATED              : October 29, 2019
INVENTOR(S)        : Sanjoy Paul et al.

Page 1 of 1

It is certified that error appears in the above-identified patent and that said Letters Patent is hereby corrected as shown below:

In the Claims

In Column 24, Line 63, Claim 1, "date" should read "data".

Signed and Sealed this
Thirty-first Day of December, 2019

Andrei Iancu
*Director of the United States Patent and Trademark Office*